US012755528B1

(12) United States Patent
Khan et al.

(10) Patent No.: US 12,755,528 B1
(45) Date of Patent: Oct. 6, 2026

(54) SYSTEM AND METHOD FOR A MULTI-SCALE ADAPTIVE SCALE-SPACE PYRAMID NETWORK FOR AERIAL SCENES RECOGNITION

(71) Applicant: PRINCE MOHAMMAD BIN FAHD UNIVERSITY, Dhahran (SA)

(72) Inventors: Muhammad Attique Khan, Dhahran (SA); Ghassen Ben Brahim, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/541,976

(22) Filed: Feb. 17, 2026

(51) Int. Cl.
*G06V 20/17* (2022.01)
*G06V 10/25* (2022.01)
(Continued)

(52) U.S. Cl.
CPC .............. *G06V 20/17* (2022.01); *G06V 10/25* (2022.01); *G06V 10/52* (2022.01); *G06V 10/764* (2022.01);
(Continued)

(58) Field of Classification Search
CPC .................... G06V 20/17; G06V 20/13; G06T 2207/10032; G06T 2207/30181–30192; B64U 2101/30
See application file for complete search history.

(56) References Cited

U.S. PATENT DOCUMENTS

| | | | | |
|---|---|---|---|---|
| 11,521,377 B1 * | 12/2022 | Wang | ..................... | G06V 20/13 |
| 2022/0189029 A1 * | 6/2022 | Mequanint | .............. | G06T 7/194 |

FOREIGN PATENT DOCUMENTS

| | | | |
|---|---|---|---|
| CN | 113111758 A | 7/2021 | |
| CN | 114140359 A | 3/2022 | |

(Continued)

OTHER PUBLICATIONS

Yuanyuan Gui, "Multimodal Uncertainty Robust Tree Cover Segmentation for High-Resolution Remote Sensing Images", 2026 ( Year: 2026).*

(Continued)

*Primary Examiner* — Andrew W Bee
*Assistant Examiner* — Caleb L Esquino
(74) *Attorney, Agent, or Firm* — Oblon, McClelland, Maier & Neustadt, L.L.P.

(57) ABSTRACT

A remote sensing system for performing a method of real-time interpretation of aerial images includes remote imaging platforms capturing Earth images at varying scales. A machine learning processing circuitry employs a deep learning model with a Gaussian pyramid module to generate multi-scale feature maps. A scale selection block upsamples coarser maps to the finest scale for uniformity. Separate feature extractors convert these maps into vectors, which are combined via a scale attention module to compute attention weights. A cross-propagation feature module utilizes an uncertainty network to generate pixel-wise uncertainty maps, thereby guiding feature fusion into enhanced scale feature maps. A complexity-aware pooling mechanism preserves semantic features, which are then fed to a classification head that assigns class labels. The system outputs accurately labeled aerial images, enhancing robustness and precision in multi-scale aerial image recognition.

20 Claims, 17 Drawing Sheets

(51) Int. Cl.

| | |
|---|---|
| ***G06V 10/52*** | (2022.01) |
| ***G06V 10/764*** | (2022.01) |
| ***G06V 10/77*** | (2022.01) |
| ***G06V 20/13*** | (2022.01) |
| ***G06V 20/70*** | (2022.01) |

(52) U.S. Cl.
CPC .......... *G06V 10/7715* (2022.01); *G06V 20/13* (2022.01); *G06V 20/70* (2022.01)

(56) References Cited

FOREIGN PATENT DOCUMENTS

| | | | | | |
|---|---|---|---|---|---|
| CN | 117274608 B | * | 2/2024 | ............. | G06V 10/26 |
| CN | 118657906 A | | 9/2024 | | |
| CN | 119152205 A | | 12/2024 | | |

OTHER PUBLICATIONS

Longyuan Ding, "Pointnet: Learning Point Representation for High-Resolution Remote Sensing Imagery Land-Cover Classification", 2021 (Year: 2021).*

Kun Zhao, "Credible Remote Sensing Scene Classification Using Evidential Fusion on Aerial-Ground Dual-view Images", Jan. 2023 (Year: 2023).*

Lei Zhao, "A improved pooling method for convolutional neural networks", 2024 (Year: 2024).*

* cited by examiner

SYSTEM AND METHOD FOR A MULTI-SCALE ADAPTIVE SCALE-SPACE PYRAMID NETWORK FOR AERIAL SCENES RECOGNITION

STATEMENT REGARDING PRIOR DISCLOSURE BY THE INVENTORS

Aspects of this technology are described in an article "A Novel Multi-Scale Feature Fusion With Adaptive Scale-Space Pyramid Network for Aerial Scene Recognition Using Remote Sensing Images," IEEE Journal of Selected Topics in Applied Earth Observations and Remote Sensing (2026). The article is herein incorporated by reference in its entirety.

BACKGROUND

Technical Field

The present disclosure is directed to remote imaging by multiple sources, particularly involving the processing and interpretation of visual data captured from aerial or remote sensing platforms.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In the field of remote sensing image analysis, data is typically characterized by large volumes of visual information captured across multiple spatial resolutions and diverse environmental conditions. Such data often encompasses a wide range of scene types and features, presenting challenges in effectively extracting meaningful representations that capture both fine details and broader contextual information. The inherent variability in scale, resolution, and scene complexity necessitates approaches that can handle multi-scale data to support accurate interpretation and classification.

Challenges commonly encountered in this domain include the difficulty of balancing the preservation of detailed spatial features with the integration of global semantic context. Variations in image quality, resolution disparities, and the presence of noise or ambiguity can further complicate the extraction of robust and discriminative features. These factors may limit the effectiveness of conventional analysis techniques, which often rely on fixed-scale processing or uniform feature extraction strategies, potentially leading to suboptimal recognition performance.

An object is a deep learning model-based system and method of adaptively processing multi-scale image data to enhance recognition accuracy and robustness across varying spatial resolutions. An object is a deep learning model that enhances interpretability and generalization compared to fixed-scale architectures. A further object is a deep learning model that dynamically adjusts scale-space responses to capture both fine-grained object boundaries and high-level scene semantics. A further object is a deep learning architecture that reduces redundancy and noise in feature representation. A further object is a deep learning model that is computationally efficient and scalable for large remote sensing datasets. The system and method can achieve reliable and efficient analysis of remote sensing imagery, supporting a wide range of applications including environmental monitoring, urban planning, resource management, and other areas where precise scene understanding from remote sensing data is critical.

SUMMARY

In an exemplary embodiment, a remote sensing system is described. The remote sensing system includes a plurality of remote imaging platforms for capturing a plurality of aerial images of the Earth at multiple resolutions. The remote sensing system further includes a machine learning processing circuitry configured for a deep learning model including an input device configured to input an image of the plurality of aerial images. The remote sensing system further includes a Gaussian pyramid module configured to learn to generate multiple feature maps, at different original scales ranging from coarse to fine scales, from the input image. The remote sensing system further includes a scale selection block to recalibrate significance of features in the feature maps across the different original scales dynamically, by up sampling a coarsest three of the feature maps to match dimensions of the finest feature map, such that the multiple feature maps are at the same dimension. The remote sensing system further includes a feature extraction module having a plurality of separate feature extractors to convert respective feature maps from the scale selection block into 1D dimension vectors, wherein the 1D dimension vectors are stacked across scales to form a single vector, which is passed through a scale attention module to obtain attention weights. The remote sensing system further includes a cross propagation feature module that passes the generated multiple feature maps from the Gaussian pyramid module through an uncertainty network to generate a corresponding uncertainty map, which contains an uncertainty score for each pixel in the input image, wherein the generated multiple feature maps are concatenated with each other according to the uncertainty maps to generate enhanced feature maps, which undergo fusion and addition to generate an enhanced scale feature map. The remote sensing system further includes a complexity-aware pooling mechanism to preserve both semantic and discriminative features based on the recalibrated feature maps and the enhanced feature maps; and a classification head to classify the aerial images into a corresponding class; and an output device configured to output the aerial images and a respective label for the corresponding class.

In another exemplary embodiment, a method for real time interpretation of aerial images is described. The method includes capturing, by a plurality of remote imaging platforms, a plurality of aerial images of the Earth at multiple resolutions, inputting, by an input device, an image of the plurality of aerial images, learning to generate, by a Gaussian pyramid module of machine learning circuitry, multiple feature maps, at different original scales ranging from coarse to fine scales, from the input image. The method includes recalibrating significance, by a scale selection block, of features in the feature maps across the different original scales dynamically, by up sampling a coarsest three of the feature maps to match dimensions of the finest feature map, such that the multiple feature maps are at the same dimension. The method includes converting, by a feature extraction module having a plurality of separate feature extractors, respective feature maps from the scale selection block into 1D dimension vectors, wherein the 1D dimension vectors are stacked across scales to form a single vector, which is passed through an attention module to obtain attention weights. The method includes passing, by a cross propagation feature module, the generated multiple feature maps from the Gaussian pyramid module through an uncertainty network to generate a corresponding uncertainty map, which contains an uncertainty score for each pixel in the input image, wherein the generated multiple feature maps are concatenated with each other according to the uncertainty maps to generate enhanced feature maps, which undergo fusion and addition to generate an enhanced scale. The method includes preserving, by a complexity-aware pooling mechanism, both semantic and discriminative features based on the recalibrated feature maps and the enhanced feature maps. The method includes classifying, by a classification head, the aerial images into a corresponding class and outputting, by an output device, the aerial images and a respective label for the corresponding class.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
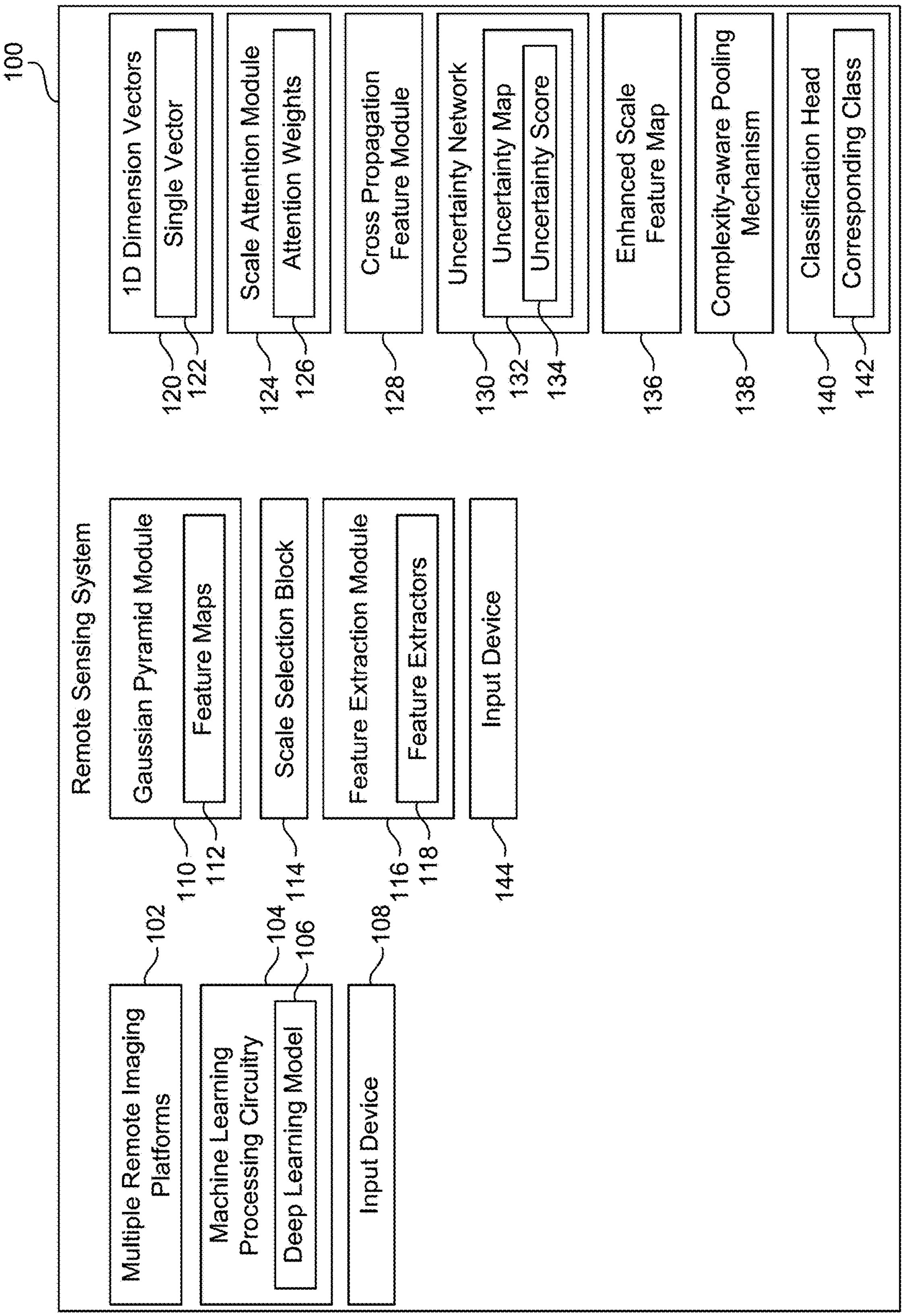
FIG. 1A illustrates a system block diagram for multiple types of remote imaging platforms in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present invention relates to a deep learning model, termed the Adaptive Scale-Space Pyramid Network (ASSPN), for real-time aerial image recognition in remote sensing applications. ASSPN provides superior generalization to different remote sensing datasets with improved precision, recall, and overall classification accuracy. The ASSPN addresses the challenge of effectively capturing and integrating multi-scale spatial and semantic features from aerial images acquired at varying resolutions, such as those obtained from satellites, airborne instruments, and unmanned aerial vehicles (UAVs). The ASSPN integrates a learnable Gaussian pyramid module to capture multi-scale feature representations. It employs a scale attention block to recalibrate the significance of features across different scales dynamically. Additionally, an uncertainty-based fusion module is implemented to enhance feature maps by effectively integrating multi-scale information based on confidence, thereby reducing redundancy and noise in feature representation. A complexity-aware pooling mechanism is employed to preserve both semantic and discriminative features. These refined features are then passed to the classification head for classifying remote sensing images across various resolutions.

The architecture of the deep learning model includes adaptive pyramid modules that have learnable scale weights for better spatial consistency. Multi-level fusion across shallow and deep layers provide robust global-local representation. The architecture has an encoder-decoder design that enhances recognition accuracy while reducing computational cost.

The following detailed description elucidates the structure, operation, and interrelation of the system components, referencing the accompanying figures to provide a comprehensive understanding of the invention.

Referring now to FIG. 1A, a remote sensing system 100 block diagram for multiple types of remote imaging platforms is depicted, according to certain embodiments. As shown in FIG. 1, the remote sensing system 100 configured for real-time aerial image recognition using the ASSPN architecture comprises multiple interconnected functional modules and devices arranged to facilitate the flow of image data through a deep learning-based processing pipeline. The remote sensing system 100 includes multiple remote imaging platforms 102, representing a variety of different remote sensing image acquisition sources, including satellites, airborne instruments, and UAVs, which capture images at varying spatial resolutions. These platforms 102 serve as the initial source of raw image data.

Another component of the remote sensing system 100 is the machine learning processing circuitry 104. The machine learning processing circuitry 104 embodies the computational hardware and software resources responsible for executing the deep learning model. Incorporated within the machine learning processing circuitry 104 is a deep learning model 106, which implements the ASSPN architecture. The deep learning model 106 operates on the hardware resources provided by the processing circuitry 104, the remote sensing system 100 includes an input device that serves as the interface for receiving input images or data streams from the remote imaging platforms. The input device 108 mentioned herein may include a data interface, a storage unit, or an electronic component that delivers the images from the platforms to the deep learning model 106.

Upon successful receiving of the aerial images from different remote sensing image acquisition sources, the aerial images are input into the deep learning model 106. A Gaussian pyramid module 110 is configured within the remote sensing system 100 to receive the aerial images from the input device 108 and/or the deep learning model 106. The Gaussian pyramid module 110 performs multi-scale image processing by generating blurred and down-sampled (converted to lower resolution) versions of the input image using learnable Gaussian kernels. Accordingly, multiple feature maps 112 are produced by the Gaussian pyramid module 110.

Upon successful generation of the feature maps 112, the remote sensing system 100 feeds the generated feature maps 112 towards a scale selection block 114. The scale selection block 114 implements the scale selection attention mechanism, dynamically recalibrating the importance of features across scales by up-sampling the three coarsest feature maps to match the dimensions of the finest feature map. As a result, all feature maps 112 are standardized to the same dimension, allowing for easier comparison and combination.

Based on the standardization of the feature maps 112 to the same dimension, a feature extraction module 116, containing feature extractors 118, extracts convolutional features from each scale of the image pyramid. These feature extractors 118 convert the processed feature maps 112 from the scale selection block 114 into one-dimensional (1D) vectors 120. These one-dimensional (1D) vectors 120, each representing features at a different scale, are then stacked to form a single vector 122. This vector passes through a scale attention module, which computes attention weights that indicate the relevance of features across scales.

Upon successful stacking of the one-dimensional (1D) vectors 120 into a single vector 122, the remote sensing system 100 passes the single vector 122 through a scale attention module 124, which contains attention weights 126. The scale attention module 124 processes the pooled vectors through a two-layer attention network with ReLU and SoftMax activations to generate scale attention weights, dynamically weighting the importance of each scale's features. Accordingly, the remote sensing system 100 initiates a cross-propagation feature module 128, which facilitates the fusion of features across adjacent scales and interacts with an Uncertainty network 130, which generates uncertainty map(s) 132 to guide the selective fusion of features. Nested within the uncertainty network 130 are the uncertainty map 132 and the uncertainty score 134, which provide pixel-wise uncertainty scores and aggregated uncertainty information, respectively.

The output of the cross-propagation feature module 128 is the enhanced scale feature map 136, representing the adaptively fused and refined multi-scale features. These enhanced scale feature maps 136 are then fed into a Complexity-aware pooling mechanism 138, which computes a complexity score for the input image and adaptively combines max-pooled and average-pooled features weighted by this score, balancing semantic and discriminative information. Finally, the processed features from the complexity-aware pooling mechanism 138 are passed to a classification head 140, comprising fully connected layers, dropout, and activation functions that output class log its. The corresponding class 142 represents the final predicted class label selected based on the highest log it score. An output device 144 receives the classification results from the classification head 140 and corresponding class 142, delivering the classification outcomes to external systems or users.

Functionally, the components of the remote sensing system 100 operate sequentially and interdependently. The multiple remote imaging platforms 102 capture aerial images, which are input via the input device 108 into the machine learning processing circuitry 104. Within the processing circuitry 104, the deep learning model 106 orchestrates the processing pipeline beginning with the Gaussian pyramid module 110, which generates multi-scale blurred images and corresponding feature maps 112. These feature maps 112 are processed by the scale selection block 114 and feature extraction module 116 to extract scale-specific features, which are pooled into 1D vectors 122. The scale attention module 124 computes attention weights 126 that dynamically recalibrate the importance of each scale's features. The cross-propagation feature module 128, guided by uncertainty maps and scores from the uncertainty network 130, selectively fuses features across scales to produce enhanced scale feature maps 136. These enhanced features are adaptively pooled by the complexity-aware pooling mechanism 138, which balances max and average pooling based on image complexity. The pooled features are then classified by the classification head 140, yielding a corresponding class 142 prediction. The output device 144 conveys the classification results externally.

Figure 1B:
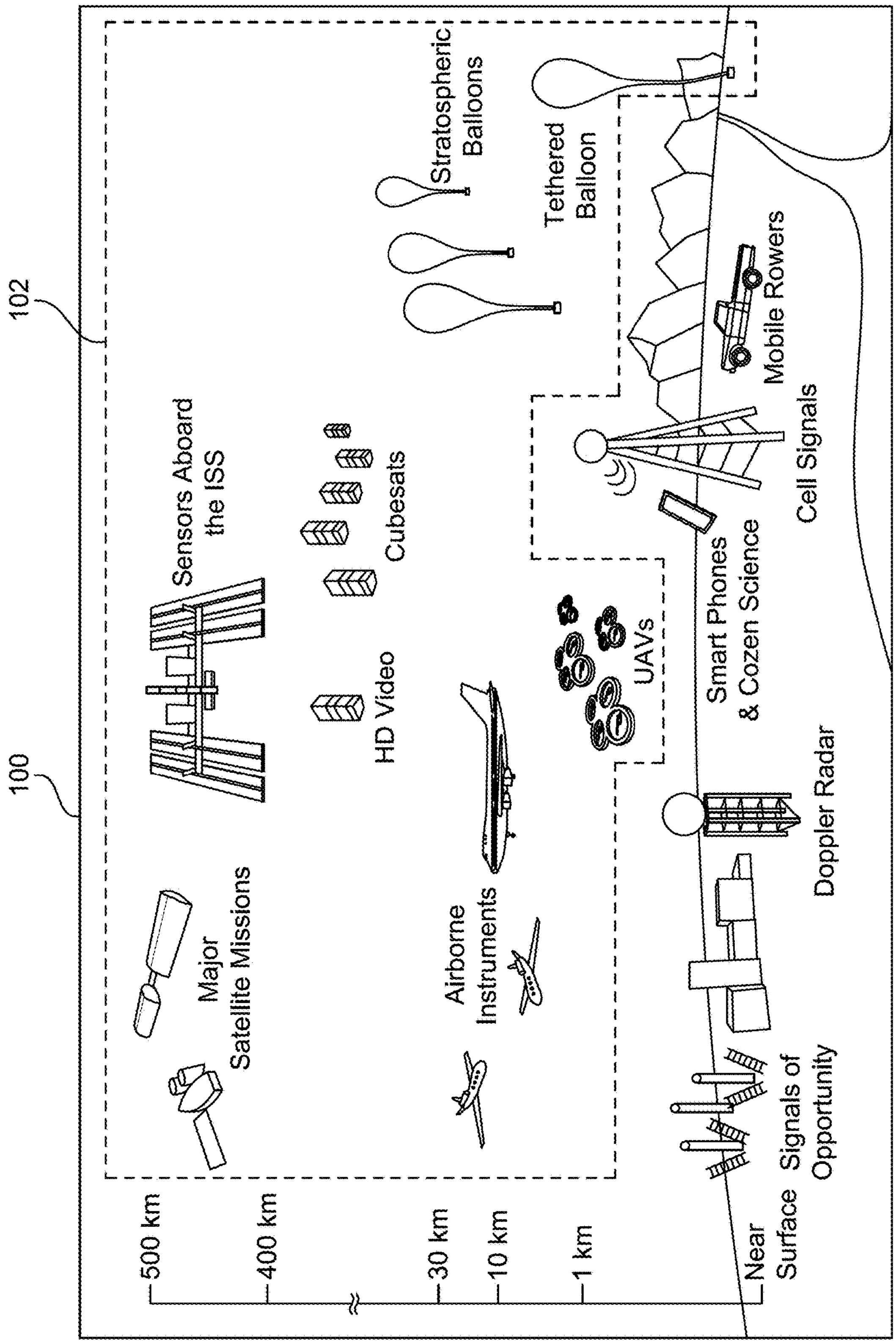
FIG. 1B illustrates multiple types of remote imaging platforms in accordance with an exemplary aspect of the disclosure.

FIG. 1B depicts multiple types of remote imaging platforms, primarily a multi-altitude aerial and near-surface sensing system for capturing diverse spatial and spectral data relevant to real-time aerial image recognition applications, in accordance with an exemplary aspect of the disclosure.

The remote sensing system 100 extends vertically from near-surface level up to approximately 500 kilometers altitude, with graduated altitude markers at 1 km, 10 km, 30 km, 75 km, 400 km, and 500 km. This vertical stratification organizes sensing devices and platforms according to their operational altitudes. At the lowest altitude near the surface, ground-based signal sources and sensors, such as "Signals of Opportunity," are depicted as antenna-like structures emitting signals upward. Adjacent urban infrastructure elements, including buildings and communication towers, which constitute terrestrial data sources and relay stations. A Doppler radar installation is also illustrated, indicating the presence of active remote sensing instrumentation.

Ascending to the lower atmosphere, airborne instruments including fixed-wing aircraft and UAVs are positioned between approximately 1 km and 10 km altitude. UAVs are shown in clusters, emphasizing their role in capturing high-resolution aerial imagery and environmental data at variable spatial scales. Further upward, stratospheric platforms such as tethered and free-floating balloons are positioned near 30 km altitude, serving as stable observation points for prolonged data acquisition over wide areas.

At altitudes approaching low Earth orbit, satellite-based sensing platforms are depicted, including the International Space Station (ISS) and smaller satellite constellations such as cubesats, orbiting at approximately 400 km to 500 km altitude. Interspersed among these platforms are communication and data relay elements, including cell signal towers and mobile rovers, facilitating data transmission and ground truth validation. The presence of smartphones and citizen science icons near the surface level indicates integration of crowdsourced data within the remote sensing ecosystem.

Functionally, the components of system 102 operate synergistically to provide multi-scale, multi-resolution data inputs that the ASSPN architecture processes. The diverse altitude platforms capture imagery and sensor data at varying spatial resolutions and contextual scales, which are then fed into the Gaussian Pyramid Module for adaptive multi-scale feature extraction. The hierarchical arrangement of sensing platforms corresponds to the multi-scale inputs processed by the network, enabling dynamic recalibration of feature importance across scales.

Figure 1C:
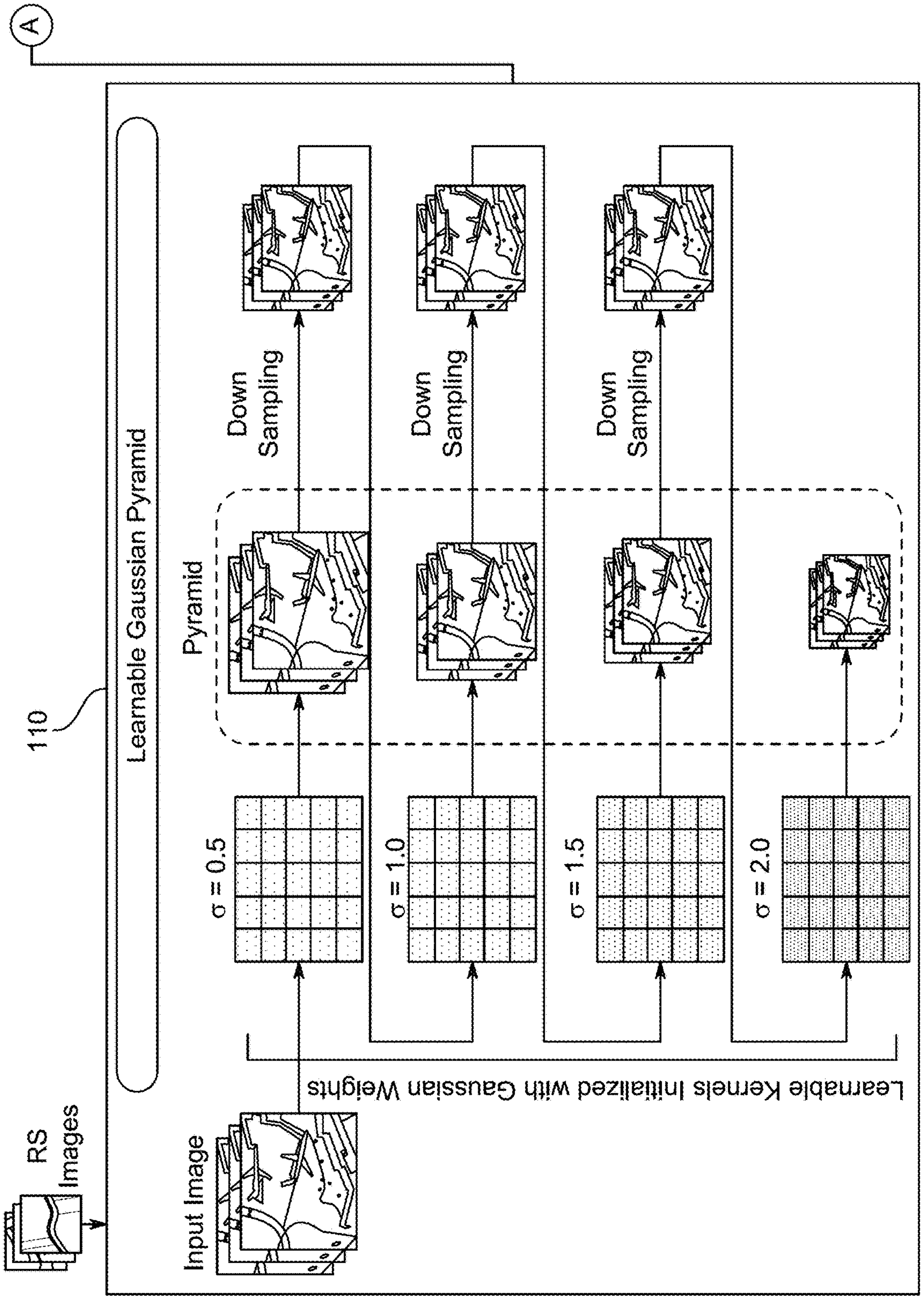
FIG. 1C illustrates methodological framework of proposed Adaptive Scale-Space Pyramid Network (ASSPN) in accordance with an exemplary aspect of the disclosure.
Figure 1C:
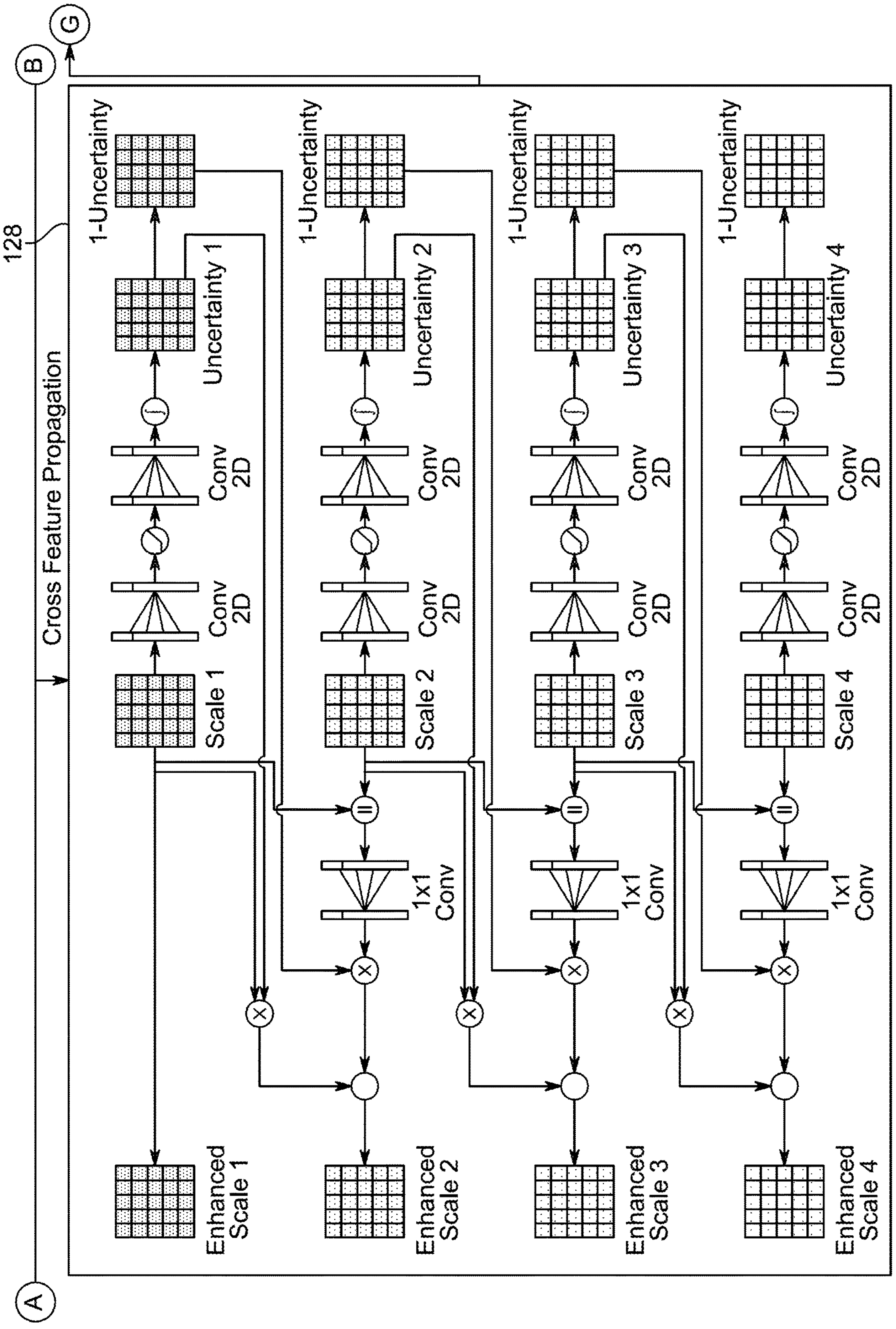
Figure 1C:
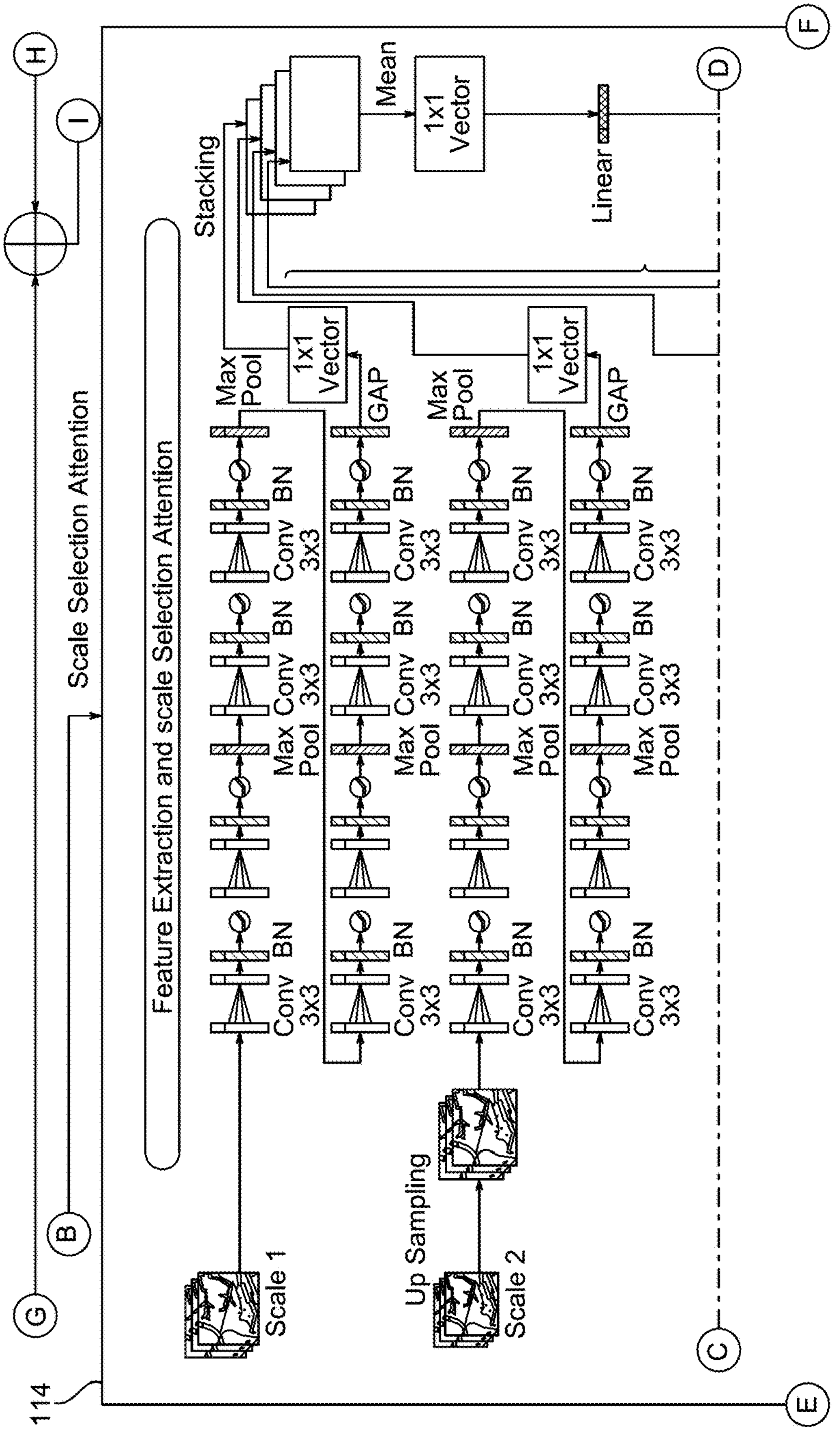
Figure 1C:
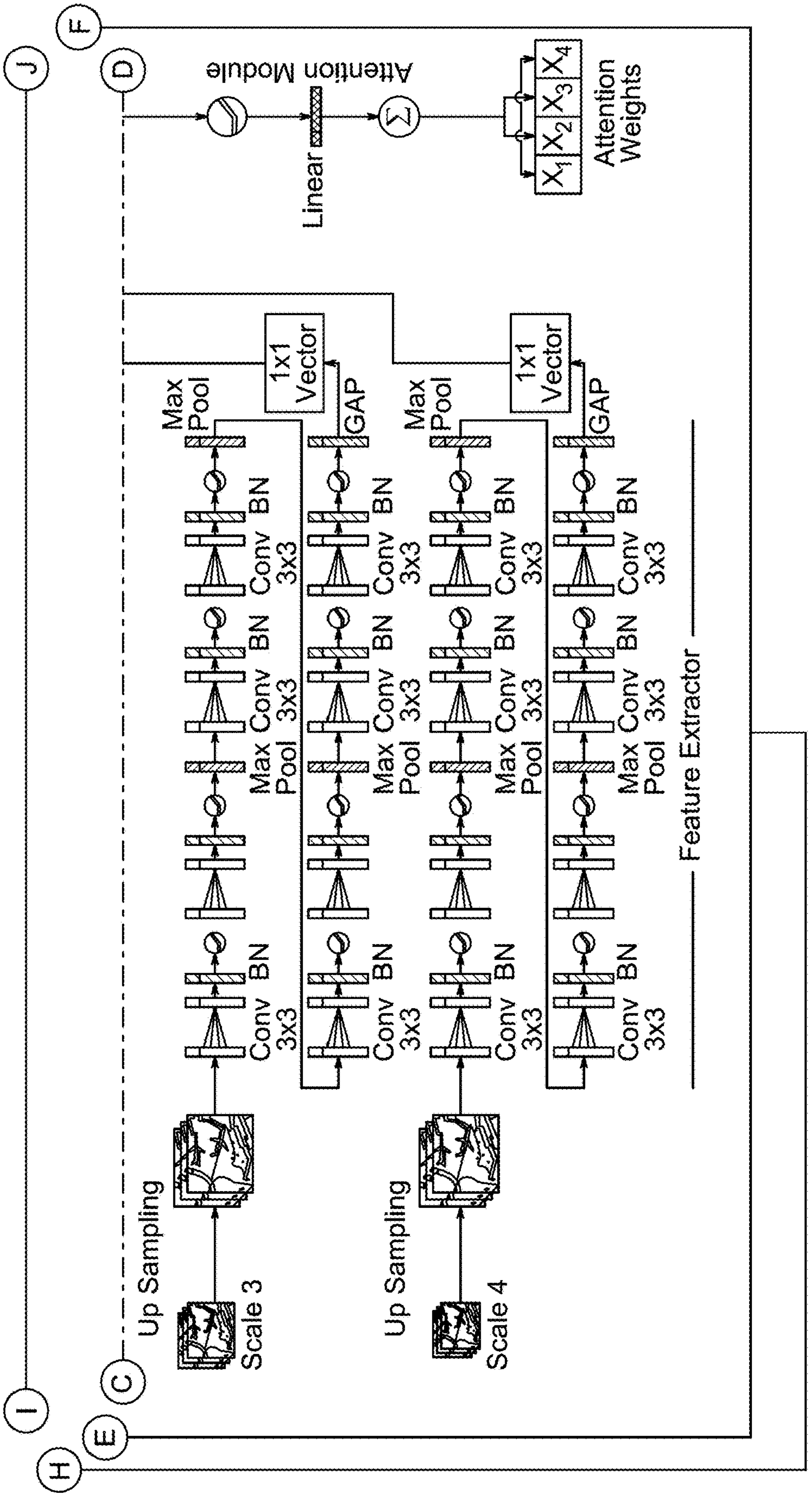
Figure 1C:
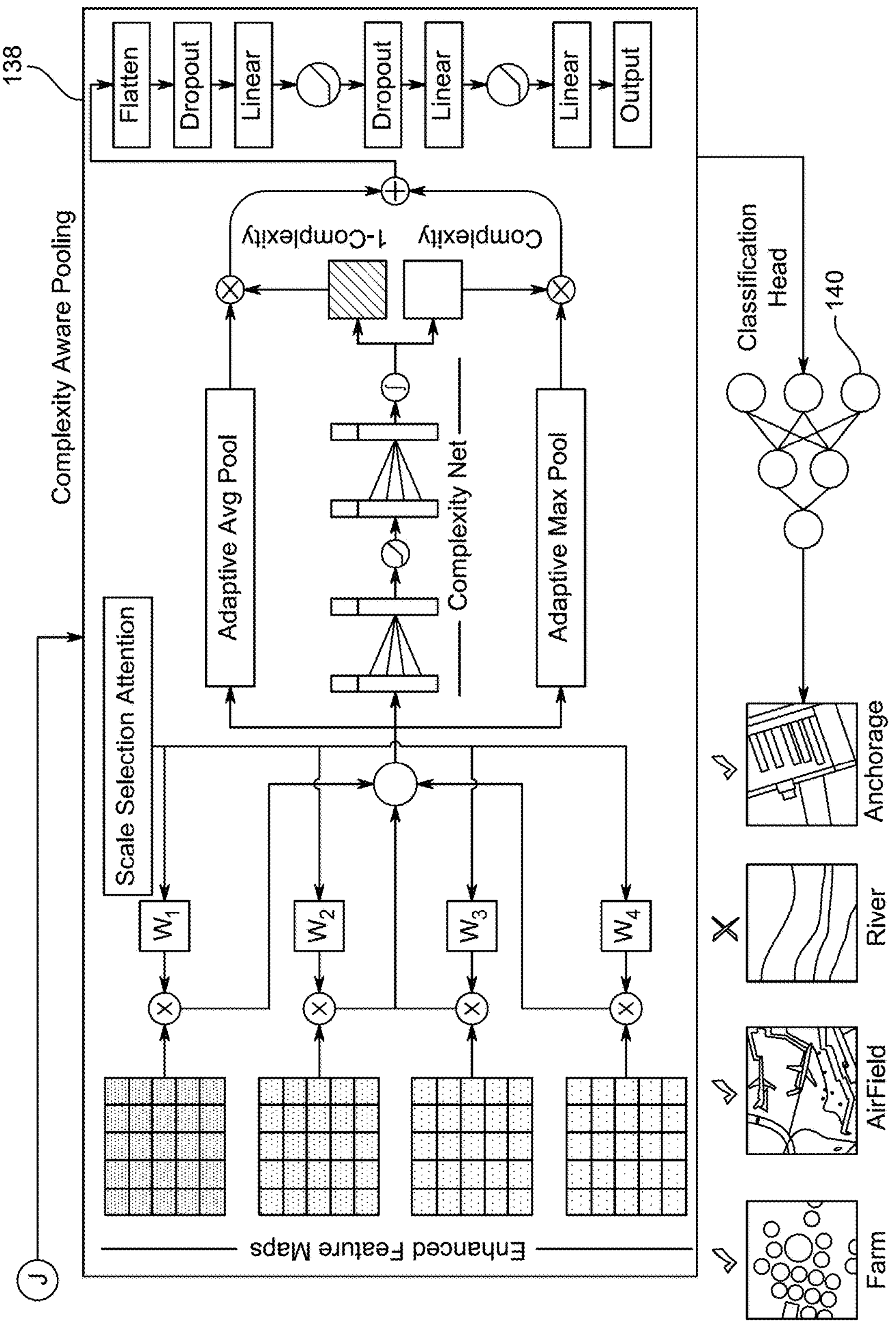

FIG. 1C depicts a methodological framework of the proposed ASSPN, in accordance with an exemplary aspect of the disclosure.

The framework includes an input for remote sensing (RS) images 110, typically images acquired from satellites, airborne instruments, or UAVs, represented as multi-channel tensors of size 224×224×3. The first major component, the Gaussian pyramid module 110, processes the input RS images through a series of convolutional kernels initialized with Gaussian weights of progressively increasing blur strengths. The input image undergoes convolution with a Gaussian kernel at scale zero, producing a blurred image at the finest scale. Subsequent scales are generated by down sampling the previous scale by a factor of 0.5 and convolving with Gaussian kernels of increasing standard deviation, thereby creating a set of four multi-scale images arranged in a pyramid structure.

The output of the Gaussian pyramid module 110 feeds into two parallel modules: the scale attention module 124 and the cross-propagation feature module 128. The scale attention module 124 receives the multi-scale images, with the coarsest three scales upsampled to match the spatial dimensions of the finest scale. Each scale is processed through identical feature extractors composed of convolutional blocks with batch normalization, ReLU activations, and max pooling layers. The feature maps 112 extracted from each scale are subjected to global average pooling, converting spatial feature maps into one-dimensional vectors 120. The one-dimensional vectors 120 are averaged across scales to form a combined single vector 122, which is passed through a two-layer attention network comprising ReLU and SoftMax activations. The output of this attention network is a set of attention weights 126 within the scale attention module 124.

Accordingly, the cross-propagation feature module 128 receives the enhanced feature maps 112 from each scale and processes them through an uncertainty network 130. The uncertainty network 130 comprises convolutional layers with 1×1 kernels and ReLU activations, culminating in sigmoid activations that produce pixel-wise uncertainty maps 132 for each scale. These uncertainty maps 132 are visualized as grids labeled "Uncertainty 1," "Uncertainty 2," etc. The cross-propagation feature module 128 utilizes these uncertainty maps 132 to guide the fusion of adjacent scale features by weighting concatenated feature maps 112 and original finer scale features. This fusion operation is represented by concatenation symbols and element-wise multiplication nodes within the cross-propagation feature module 128. The cross-propagation feature module 128 outputs enhanced feature maps for each scale, which are then forwarded to the next processing stage.

The enhanced feature maps from the cross-propagation feature module 128 and the attention weights 126 from the scale attention module 124 converge and are input to the complexity-aware pooling module 138. The complexity-aware pooling module 138 receives the weighted sum of enhanced feature maps, where each scale's enhanced features are multiplied by their corresponding attention weights 126 and summed to form a combined feature representation. The complexity-aware pooling mechanism 138 contains parallel max pooling and average pooling operations applied to the combined feature map 112, producing feature maps 112 labeled as $F_{max}$ and $F_{avg}$. A complexity network, depicted as convolutional layers with 3×3 and 1×1 kernels followed by ReLU and sigmoid activations, computes a complexity score $\mathcal{C}_N$ for the input image. This score is used to adaptively weight the max-pooled and average-pooled features, combining them via element-wise multiplication and addition to produce an adaptively pooled feature map $F_{adap}$.

Finally, the adaptively pooled features are passed to classification head 140, represented by a neural network icon comprising interconnected nodes arranged in layers, symbolizing a series of dropout, linear, and ReLU layers. The classification head 140 processes the pooled features to output class log its, from which the class with the highest score is selected as the predicted aerial scene category. Example aerial scene images labeled "farm," "airfield," "river," and "anchorage" are shown, with checkmarks and crosses indicating correct and incorrect classification outcomes, respectively, illustrating a practical application and performance of the remote sensing system 100.

Figure 1D:
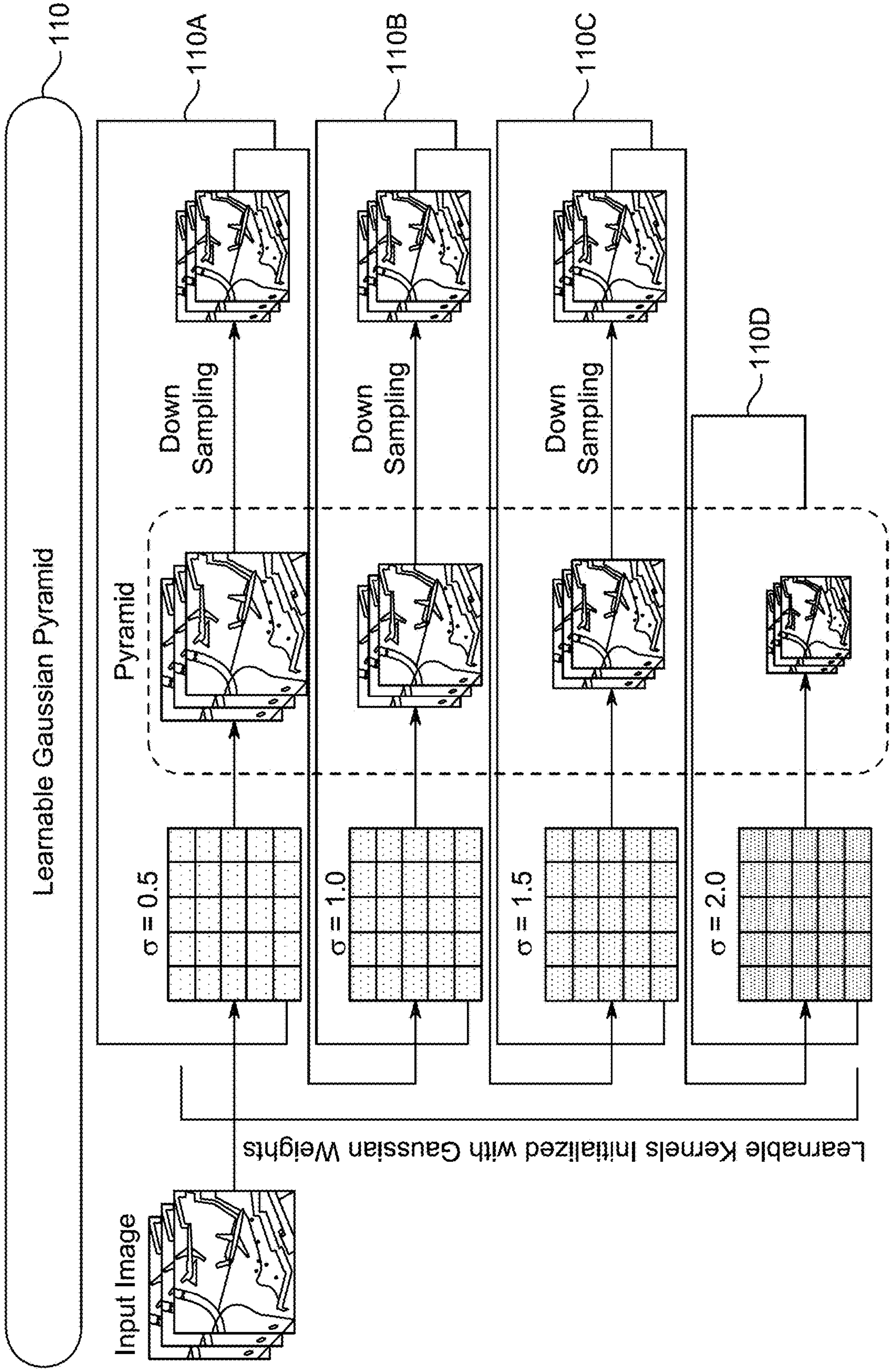
FIG. 1D illustrates a learnable Gaussian Pyramid module for Remote Sensing (RS) image classification in accordance with an exemplary aspect of the disclosure.

FIG. 1D illustrates the learnable Gaussian pyramid module 110 for RS image classification, in accordance with an exemplary aspect of the disclosure. The Gaussian pyramid module 110 transforms an input aerial image of fixed dimensions into a multi-scale pyramid of progressively blurred and down sampled image representations, each corresponding to a distinct spatial scale and blur strength, thereby enabling adaptive multi-scale feature extraction.

The input image is fed into the learnable Gaussian pyramid module 110, which contains four distinct convolutional kernels configured with Gaussian weights characterized by increasing standard deviations σ=0.5, 1.0, 1.5, and 2.0, respectively. These kernels are represented as square matrices with grayscale intensity values corresponding to the Gaussian distribution, where darker central pixels indicate higher weights. Each kernel operates on the input image or its downsampled predecessor to produce a blurred image at a specific scale. The first kernel (σ=0.5) convolves directly with the input image, generating the finest scale blurred image (110A). This output is then down sampled by a factor of 0.5 and processed by the second kernel (σ=1.0), producing the second scale blurred image (110B). This iterative process continues for the third and fourth kernels (σ=1.5 and 2.0), each receiving the downsampled output of the previous scale, applying the respective Gaussian convolution, and producing progressively coarser scale images (110C and 110D). The outputs collectively form the Gaussian pyramid.

Mathematically, the Gaussian kernel for scale j is defined as:

$$K_j(x, y) = e^{-\frac{(x-\lambda)^2+(y-\lambda)^2}{2\sigma_j^2}} \quad \text{where} \tag{1}$$

$$\lambda = \frac{\kappa_S - 1}{2} \tag{2}$$

$K_S$ is the kernel size, and the blur strength $$\sigma_j = 0.5 + 0.5_j \text{ for } j = 0, 1, 2, 3. \tag{3}$$

Each blurred image $V_j$ is down sampled by a factor of 0.5 relative to the previous scale:

$$\begin{cases} V_0 = K_0 * Z \\ V_1 = K_1 * \partial(V_0, 0.5) \\ V_j = K_j * \partial(V_{j-1}, 0.5), \; j = 2, 3 \end{cases} \quad (4)$$

Here, Z is the input image, and ∂(•,0.5) denotes down sampling by 0.5.

The learnable gaussian pyramid module 110 thus generates a set of multi-scale images that capture spatial features at varying resolutions and blur levels. The Gaussian kernels are initialized with weights corresponding to Gaussian distributions but are learnable, allowing the network to adapt the blur characteristics during training for optimal feature extraction. The down sampling operations reduce computational complexity and enable efficient multi-scale processing.

Figure 1E:
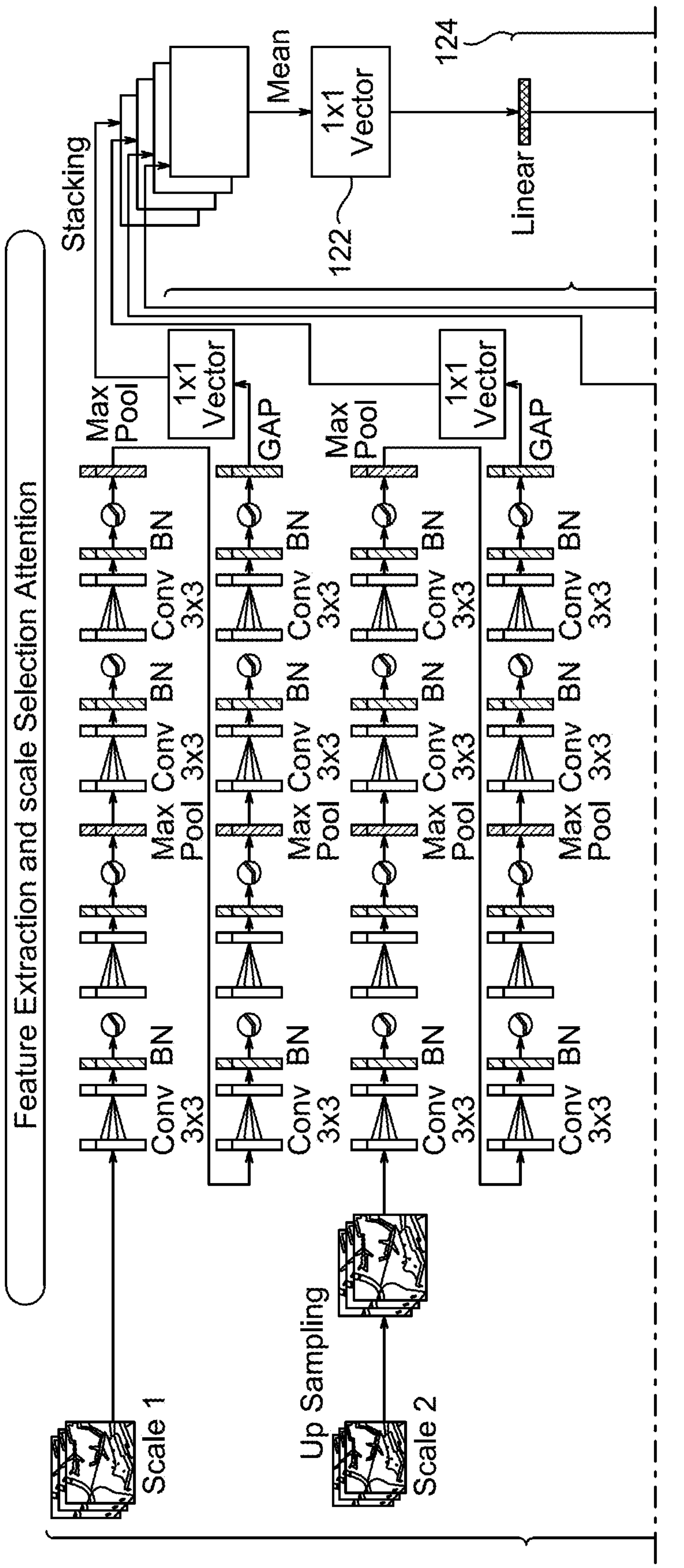
FIG. 1E illustrates Feature Extractor and Scale Selection Attention Module (SSAM) in accordance with an exemplary aspect of the disclosure.
Figure 1E:
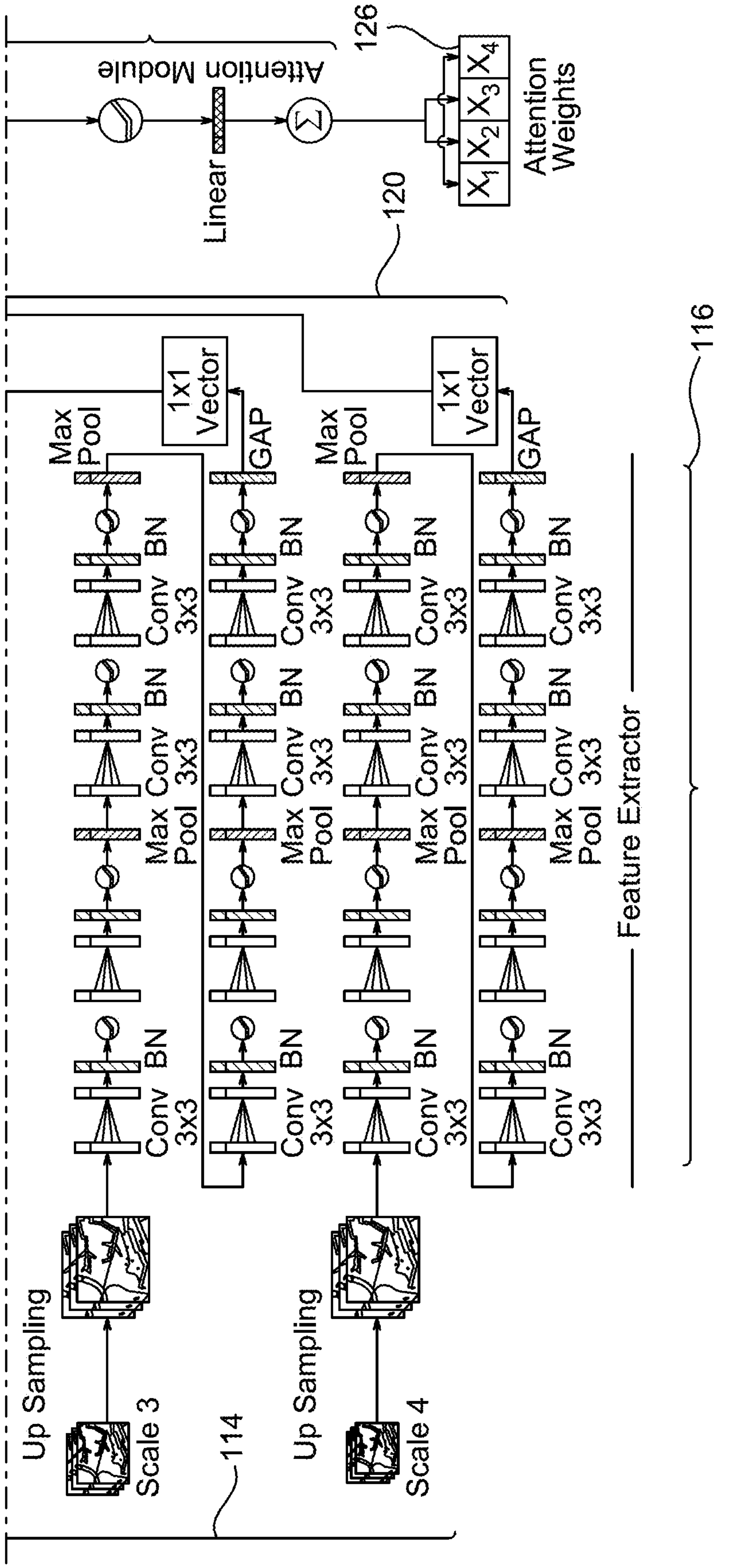

FIG. 1E illustrates the Scale selection attention module 124 (SSAM) and feature extractor 118 within the ASSPN architecture, in accordance with an exemplary aspect of the disclosure. The feature extractor 118 and the scale selection attention module 124 are configured for adaptive multi-scale feature extraction and dynamic recalibration of scale importance in aerial image recognition tasks. The scale selection attention module 124 processes four input aerial images at different spatial scales, designated as Scale 1 (finest) through Scale 4 (coarsest). Scales 2, 3, and 4 are upsampled to match the spatial resolution of Scale 1, ensuring uniform feature map dimensions for subsequent processing.

Each scale input is fed into an identical feature extractor module 116, comprising sequential convolutional blocks with 3×3 convolutional layers, batch normalization, and ReLU activation functions. The first three convolutional blocks in each feature extractor 118 are followed by MaxPooling layers, which reduce spatial dimensions (i.e., down sample) and capture hierarchical features. The feature extractor 118 processes each scale input independently, generating corresponding feature maps. The feature extractor module is mathematically formulated as:

$$F = f_{pool}(f_3(f_2(f_1(V)))) \quad (5)$$

$$f_i = (\delta(\beta(C_{3\times3}(\delta(\beta(C_{3\times3}(V))))))) \text{ for } i = 1, 2, 3 \quad (6)$$

$$f_{pool} = M_{pool}(f_i) \quad (7)$$

Where V is the input version, β denotes the batch normalization operation, δ denotes the ReLU activation layer, $C_{3\times3}$ is the convolutional operation, and $M_{pool}$ denotes the Max pooling operation. Each input version is passed to a separate feature extractor; however, all the feature extractors are identical in architecture. At the output of each Feature Extractor, a global average pooling (GAP) operation converts the multi-dimensional feature maps into 1×1 vectors, encapsulating spatially aggregated feature information for each scale.

$$F_i = F(V_i) \text{ for } i = \{0, 1, \ldots 3\} \quad (8)$$

The pooled vectors from all four scales are stacked and averaged to form a combined feature vector G:

$$g_i = GAP(F_i) = \frac{1}{H \times W} \sum_{h=1}^{H} \sum_{w=1}^{W} F_i(h, w) \quad (9)$$

$$G = \frac{1}{s} \sum_{i=0}^{s-1} g_i \quad (10)$$

where $F_i$ is the feature map for scale i, and s=4 is the number of scales and w denote the height and width of the feature map, all four vectors are stacked and averaged across scales to form a single 1×1 vector. The averaged vector G is passed through a two-layer attention network consisting of linear transformations interleaved with ReLU and culminating in a SoftMax activation to produce scale attention weights α:

$$\alpha = \psi(W'' \cdot \delta(W' \cdot G + b') + b'') \quad (11)$$

where ψ denotes the SoftMax function, δ denotes the ReLU activation, and W, b are learnable parameters. These attention weights $\alpha=[\alpha_1, \alpha_2, \alpha_3, \alpha_4]$ dynamically recalibrate the importance of each scale's features, enabling the ASSPN to focus on the most informative spatial resolutions.

Figure 1F:
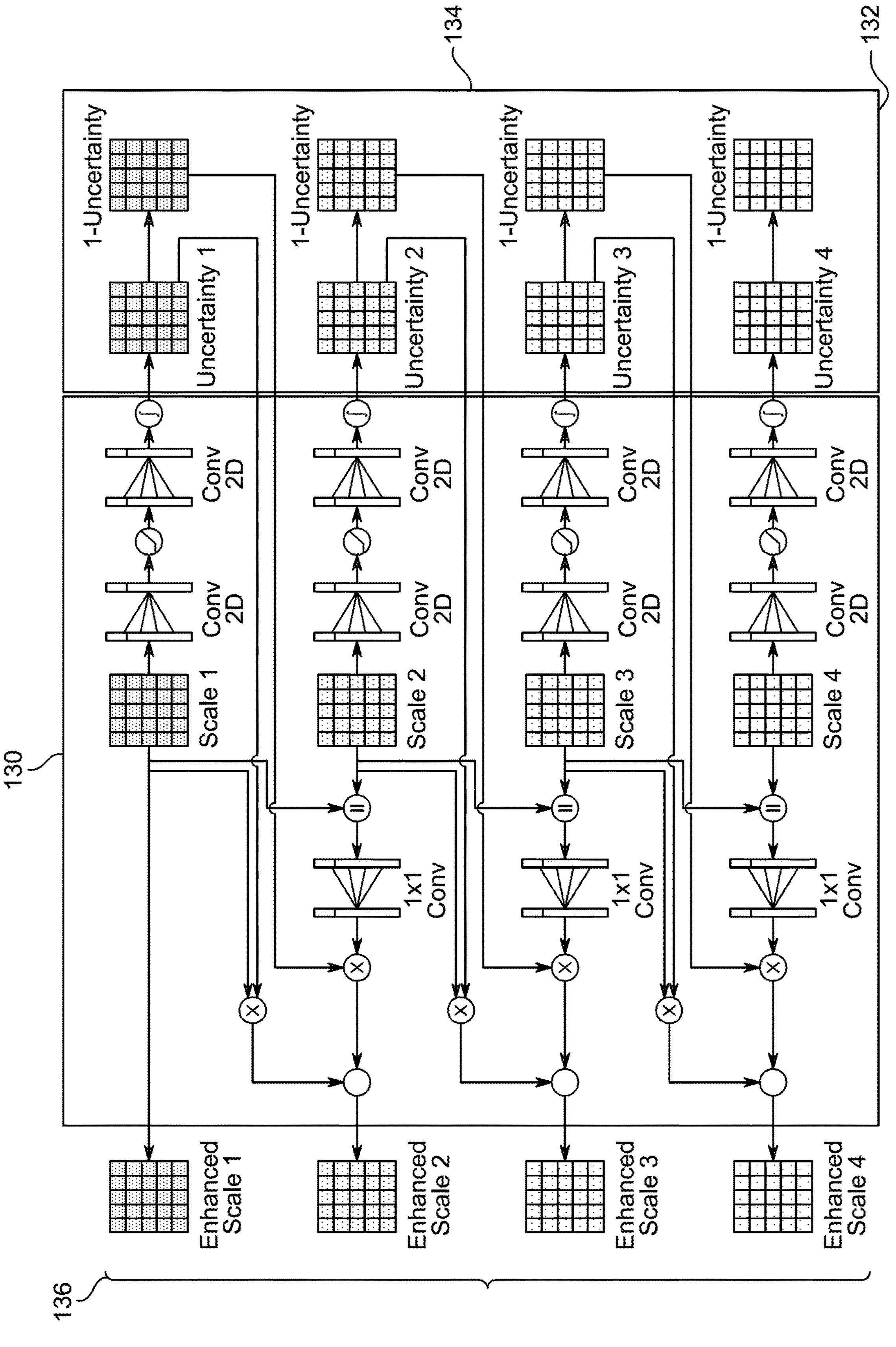
FIG. 1F illustrates Cross Feature Propagation Module (CPFM) RS images in accordance with an exemplary aspect of the disclosure.

FIG. 1F illustrates the Cross Propagation Feature Module (CPFM) 130, configured for adaptive fusion and enhancement of multi-scale feature maps. The cross-propagation feature module 128 comprises four parallel processing branches corresponding to the four spatial scales, each represented by colored square feature maps.

Each scale's feature map $F_i$ undergoes two consecutive 2D convolutional layers with ReLU activations to refine the feature representations. Subsequently, each feature map is input into an uncertainty network composed of two sequential 1×1 convolutional layers with ReLU activations, followed by a sigmoid activation u, producing an uncertainty map $U_i$ of ith scale with pixel-wise values in [0,1]:

$$U_i = \mu(C_{1\times1}(\delta(C_{1\times1}(F_i)))) \quad (12)$$

where $C_{1\times1}$ denotes a 1×1 convolution and δ denotes ReLU.

The CPFM performs adaptive fusion of adjacent scale features by concatenating the current scale's feature map $F_i$ with the immediately finer scale's feature map $F_{i-1}$:

$$F_{i\_concat} = F_i \| F_{i-1} \quad (13)$$

where || denotes concatenation. This concatenated feature undergoes a 1×1 convolution to reduce dimensionality:

$$F_{i\_fused} = C_{1\times1}(F_{i\_concat}) \quad (14)$$

The fusion output is weighted by the complement of the uncertainty map $(1-U_i)$, while the finer scale's original feature map is weighted by the uncertainty map $U_i$. These weighted components are summed to produce the enhanced scale feature map $F_{i\_enh}$:

$$F_{i\_enh} = [F_{i\_fused} \odot (1 - U_i)] + [F_{i-1} \odot U_i] \tag{15}$$

where $\odot$ denotes element-wise multiplication.

For the finest scale (Scale 1), the enhanced feature map is directly taken as the original feature map without fusion. This uncertainty-guided fusion preserves original finer-scale features in regions of high uncertainty while integrating complementary information from coarser scales where uncertainty is low. In this way, the original scale features are preserved while also adding the fused scale features. The same mechanism is applied to the other two scales. In this last module, there are four enhanced scales, which are used for further processing.

Figure 1G:
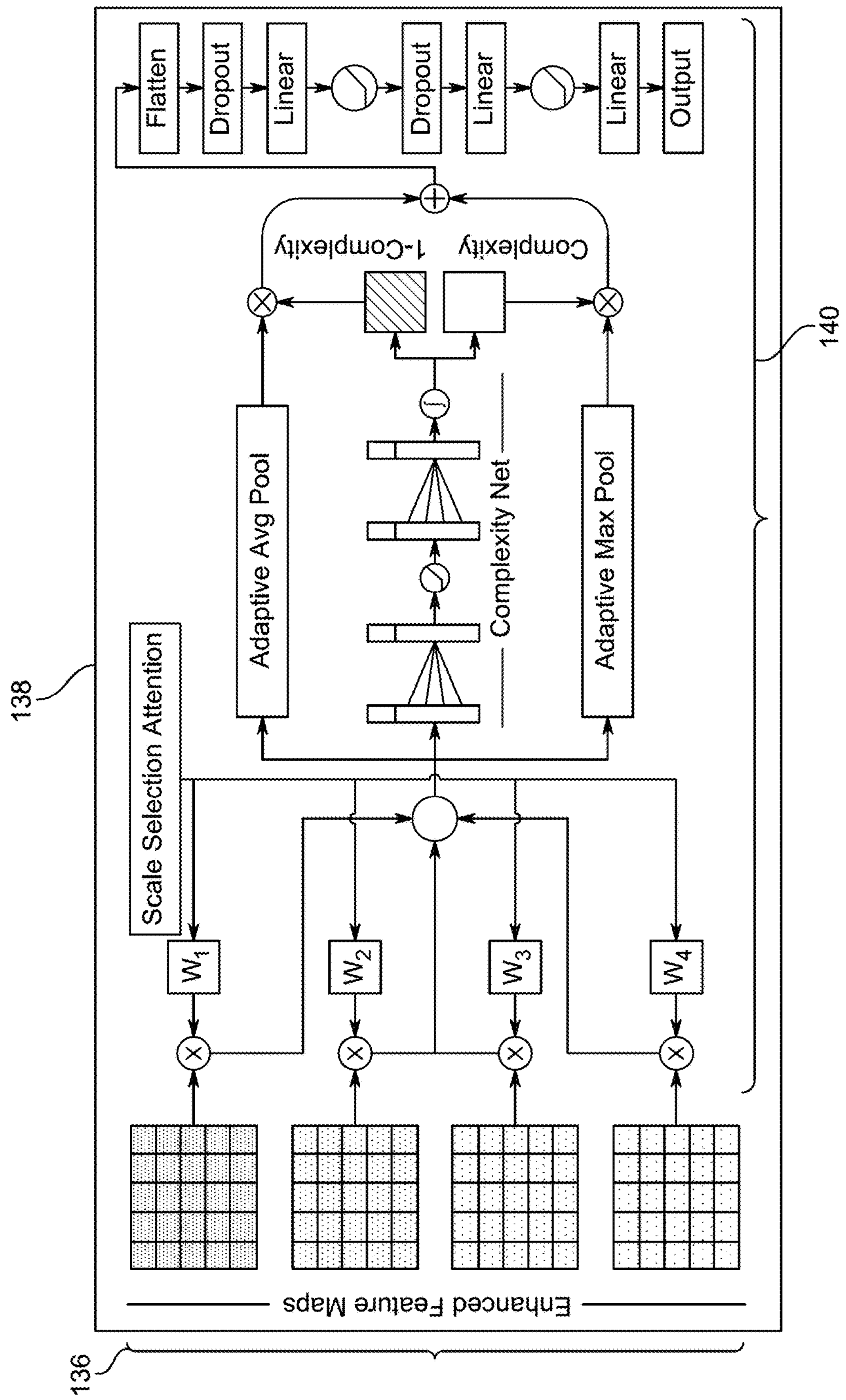
FIG. 1G illustrates Complexity Aware Adaptive Pooling Module for RS image in accordance with an exemplary aspect of the disclosure. classification model.

FIG. 1G depicts the integration and pooling stages of the multi-scale enhanced feature maps, culminating in classification output. The enhanced scale feature maps 136, each corresponding to a distinct spatial scale, are dynamically weighted by the Scale Selection Attention weights $w_i$ generated by the SSAM. Each feature map is multiplied element-wise by its corresponding weight, and the weighted feature maps are summed to produce an aggregated feature representation F:

$$F = \sum_{i=0}^{s-1} \alpha_i \times F_{i\_enh} \tag{16}$$

This aggregated feature map is input to the Complexity-Aware Pooling Module 138, which applies parallel adaptive average pooling and adaptive max pooling operations, producing pooled feature vectors $F_{avg}$ and $F_{max}$, respectively. These pooling operations capture complementary semantic and discriminative information.

A Complexity Net computes a scalar complexity score $\mathcal{C}_N$ for the input image by applying a 3×3 convolution followed by a 1×1 convolution, ReLU activation, and sigmoid activation:

$$C_N = \mu(C_{1\times1}(\delta(C_{3\times3}(F)))) \tag{17}$$

The complexity score modulates the pooling operation by weighting the max-pooled and average-pooled features:

$$F_{adap} = (C_N \odot F_{max}) + ((1 - C_N) \odot F_{avg}) \tag{18}$$

This adaptive pooling balances semantic richness and discriminative detail based on the assessed image complexity, enhancing robustness across diverse aerial scenes. The adaptively pooled feature vector $F_{adap}$ is then passed to the classification head 140, which comprises a sequence of layers including flattening, dropout, fully connected linear layers, and ReLU activations. The final linear layer outputs class log its corresponding to aerial scene categories. The class with the highest log it score is selected as the predicted category.

Figure 2:
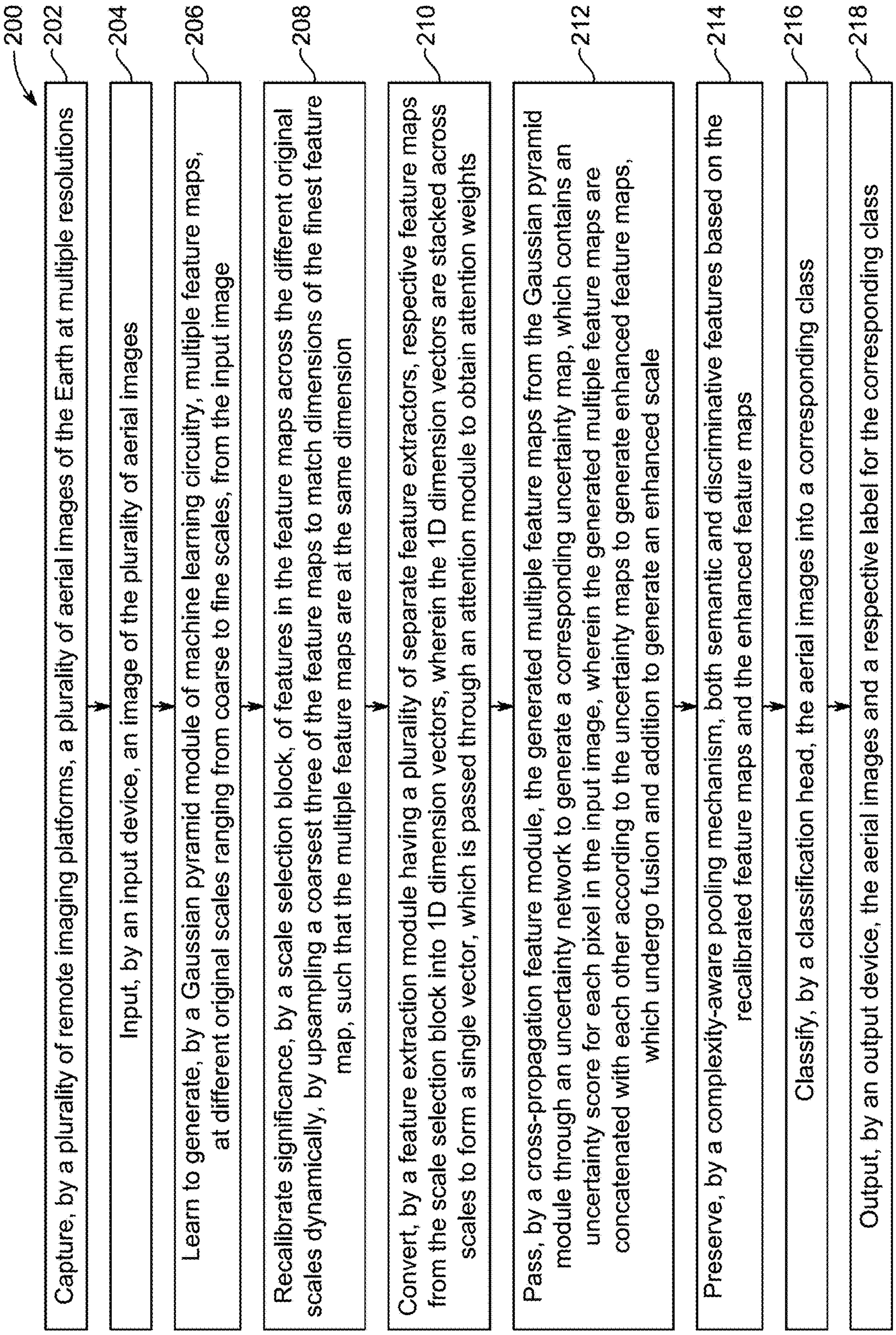
FIG. 2 depicts a method flow for image analysis and pattern recognition, according to certain embodiments.

FIG. 2 depicts a method flow 200 for image analysis and pattern recognition, according to certain embodiments.

At step 202, the method 200 includes different remote imaging platforms for capturing remote sensing images of the Earth at multiple resolutions. The platforms include one satellite and at least one unmanned aerial vehicle (UAV) for capturing multiple images of the Earth. Each platform integrates various sensors tailored for remoted sensing photography, including high-resolution optical cameras, multispectral, or thermal imagers.

By deploying various platforms, the remote sensing system 100 achieves wide-area coverage and robustness, supporting image collection across geographic regions with diverse atmospheric conditions and terrain. The platforms collect images at multiple resolutions, ranging from broad, low-detail views to precise, high-resolution images, enabling the detection and analysis of both large-scale features, such as landscapes, and small-scale objects, like vehicles or infrastructure. More specifically, the images captured by the satellite have a lower resolution, while the images captured by the UAV have a significantly higher resolution.

At step 204, the method 200 includes a machine learning processing circuitry configured for a deep learning model, including an input device configured to input an image of the plurality of remote sensing images. The processing circuitry uses specialized hardware often GPUs, TPUs, or FPGAs optimized for complex neural networks. These circuits execute deep learning models that can perform sophisticated image analysis, including object and scene detection across multiple scales. Architectures such as convolutional neural networks, transformers, or attention-based networks are typically implemented to extract features and interpret spatial relationships in the incoming aerial imagery. Moreover, the remote sensing system 100 includes a base station that comprises a receiving circuitry capable of receiving multiple aerial images of the earth from the satellite and the UAV. Upon receiving the images, a memory configured in the remote sensing system 100 stores the received images. Accordingly, a processing circuitry configured in the remote sensing system 100 that comprises a machine learning processing circuitry extract features and interpret spatial relationships in the stored aerial imagery.

Based on the extracted features and interpreted spatial relationships in the stored aerial imagery, the processing circuitry is designed to organize aerial images by region. Each region consists of an aerial image captured by at least one satellite and multiple high-resolution images captured by one or more UAVs. The remote sensing system 100 selects a region of interest from the available regions and, for the chosen region, displays the corresponding high-resolution images as detailed images alongside the aerial image captured by the satellite for that same area. Accordingly, the processing circuitry displays high-resolution images that are labeled according to their respective classes, where the resolution of the labeled high-resolution images is 5 cm or less per pixel.

Synchronously, an input device proceeds to input an image from multiple images. This modular input device serves as the gateway for images captured by the remote platforms. The input device includes high-bandwidth network interfaces, direct camera connectors, or wireless receivers compatible with the transmission technologies used by the imaging platforms. The input device is engineered to support both batch and streamed data, ensuring real-time operation as high volumes of aerial images are transferred for analysis. Data quality checks, such as format validation, checksum verification, and duplicate detection, are implemented to maintain the reliability of image flow into the system.

The input device also handles metadata synchronization, ensuring each image retains accurate information about its origin, resolution, and acquisition time. Error recovery and buffering capabilities are designed to address interruptions or delays, maintaining a smooth and dependable data intake for later processing.

At step 206, the method 200 includes a Gaussian pyramid module configured to learn to generate multiple feature maps, at different original scales ranging from coarse to fine scales, from the input image. The Gaussian pyramid module utilizes four convolutional kernels that are initialized with Gaussian weights, each designed to apply progressively stronger blur effects. As a result, it produces versions of each image that range from slightly blurred to moderately blurred, strongly blurred, and ultimately super blurred.

The Gaussian pyramid module executes multi-scale image analysis using Gaussian pyramids. An input image is repeatedly filtered and subsampled to generate a sequence of feature maps, each representing image content at a different scale. Coarse-scale maps capture global structures (such as terrain features or city boundaries), while fine-scale maps detect details (such as roads, vehicles, or small buildings). By learning how best to generate these maps for aerial imagery, the module increases the system's ability to identify a broad spectrum of features that vary in size and prominence.

Accordingly, the Gaussian pyramid module uses trainable convolutional filters and adaptive sampling rates, optimizing scale selection for aerial scene content. Layers are organized hierarchically; parameters are tuned over time as the module processes diverse images. The flexibility in scale generation is key to aerial imagery, where relevant details may be subtle or distributed over large spaces.

At step 208, the method 200 includes a scale selection block to recalibrate significance of features in the feature maps across the different original scales dynamically, by up sampling a coarsest three of the feature maps to match dimensions of the finest feature map, such that the multiple feature maps are at the same dimension.

The scale selection block governs the dynamic weighting and alignment of feature importance across scales, evaluating feature maps at different scales and recalibrating their impact on subsequent analysis. By upsampling the process of increasing pixel density in the three coarsest feature maps the scale selection block ensures that all maps share the same spatial resolution as the finest feature map. This dimensional homogeneity allows simultaneous processing, fusion, or comparison of features, regardless of their original scale.

Accordingly, the scale selection block applies advanced interpolation methods (such as bilinear or bicubic upsampling) to prevent distortion. Adaptive weighting mechanisms are employed, utilizing attention modules that learn which features from various scales are most relevant for a specific recognition task. The recalibration remains responsive to changes in image content and the environment, ensuring optimal analysis performance.

At step 210, the method 200 includes a feature extraction module having a number of separate feature extractors to convert respective feature maps from the scale selection block into 1D dimension vectors, wherein the 1D dimension vectors are stacked across scales to form a single vector, which is passed through a scale attention module to obtain attention weights.

Each feature extractor in the feature extraction module is tailored for a specific scale's feature map. These feature extractors utilize layers such as convolutions, pooling, and normalization to distill high-dimensional spatial data into single-dimension vectors that capture discriminative and semantic information. After extraction, these vectors are concatenated ("stacked") to build a comprehensive representation encompassing all scales.

The stack is then processed by the scale attention module 124, which computes attention weights to emphasize the most relevant scale-specific features for final analysis. The scale attention module uses mechanisms such as softmax weighting, self-attention layers, or context-based gating to maximize recognition accuracy. The design enables systematic focus on meaningful details while suppressing irrelevant or redundant information.

At step 212, the method 200 includes the cross-propagation feature module 130 that passes the generated multiple feature maps from the Gaussian pyramid module through an uncertainty network to generate a corresponding uncertainty map, which contains an uncertainty score for each pixel in the input image, wherein the generated multiple feature maps are concatenated with each other according to the uncertainty maps to generate enhanced feature maps, which undergo fusion and addition to generate an enhanced scale feature map.

The cross-propagation feature module 128 enhances feature reliability by assessing uncertainty at the pixel level. The uncertainty network analyzes the feature maps produced by the Gaussian pyramid, assigning each pixel a confidence score based on noise, ambiguity, or data inconsistencies. These scores form an uncertainty map that guides the concatenation of feature maps, prioritizing high-confidence pixels during the fusion process.

Accordingly, uncertainty is estimated using probabilistic models or ensemble predictions. The cross-propagation feature module is designed to enhance feature maps by generating an uncertainty map. This map assigns a score between 0 and 1 to each pixel, where a higher score indicates the model's greater uncertainty regarding that pixel, while a lower score reflects greater confidence.

Furthermore, the original scales are combined according to the uncertainty maps, resulting in multiple enhanced scale feature maps that provide richer information for analysis. The concatenation merges feature data according to pixel certainty, while fusion and addition operations combine multi-scale information into a single, enhanced scale feature map. This approach mitigates errors due to atmospheric interference or sensor limitations, improving recognition performance under variable imaging conditions.

At step 214, the method 200 includes a complexity-aware pooling mechanism to preserve both semantic and discriminative features based on the recalibrated feature maps and the enhanced feature maps.

The complexity-aware pooling mechanism aggregates network features, but this design is attentive to both semantic meaning (such as object classes) and fine, discriminative details (such as boundaries or textures). The complexity-aware pooling mechanism recalibrates and uncertainty-enhances feature maps to dynamically adjust pooling strategies by varying the pooling window size, stride, or weighting according to content complexity.

The complexity-aware pooling mechanism comprises a complexity network that assesses each image to produce a complexity score, alongside both an average pooling layer and a maximum pooling layer. The complexity-aware pooling mechanism operates by first multiplying the complexity score by the features derived from the max pooling layer. Simultaneously, the complexity-aware pooling mechanism computes the product of the average pooled features and one minus the complexity score. Finally, the complexity-aware pooling mechanism integrates the results of these two calculations to generate a unified pooled feature map. This approach effectively balances the varying levels of complexity within the images, enhancing the overall representation of the features Accordingly, adaptive pooling algorithms are implemented, often with context-based weighting or content-driven logic. The pooling layer preserves critical features, allowing the network to retain granular information on important regions while maintaining efficiency in data reduction. This ensures that essential spatial structures and subtle distinguishing marks are not lost during the aggregation process.

At step 216, the method 200 includes a classification head to classify the aerial images into a corresponding class. After feature aggregation, the classification head converts the vector representation into a categorical label. The classification head typically consists of fully connected neural layers, normalization units, and activation functions such as softmax. The classifier uses training data with pre-assigned labels to optimize decision boundaries across classes defined for aerial imagery applications, such as land cover types or infrastructure status.

At step 218, the method 200 includes an output device configured to output the remote sensing images and a respective label for the corresponding class. The output device ensures the delivery and formatting of results. The output device is capable of including high-resolution displays, cloud interfaces, network transmitters, or GIS integration modules. The output device associates each processed image with its assigned label, supporting visualization, reporting, or downstream analytics.

The Adaptive Scale-Space Pyramid Network (ASSPN) increases efficiency when interpreting aerial imagery of industrial zones, agricultural lands and transportation networks. Leveraging multi-scale feature fusion of the ASSPN model, the system can differentiate complex urban land-use types represented in aerial images, such as residential, commercial and green areas. The ability to monitor the environment is rare therefore the real time engagement with the system not only mitigates data scarcity but improve climate change response and impacts stemming from urbanization.

Figure 3:
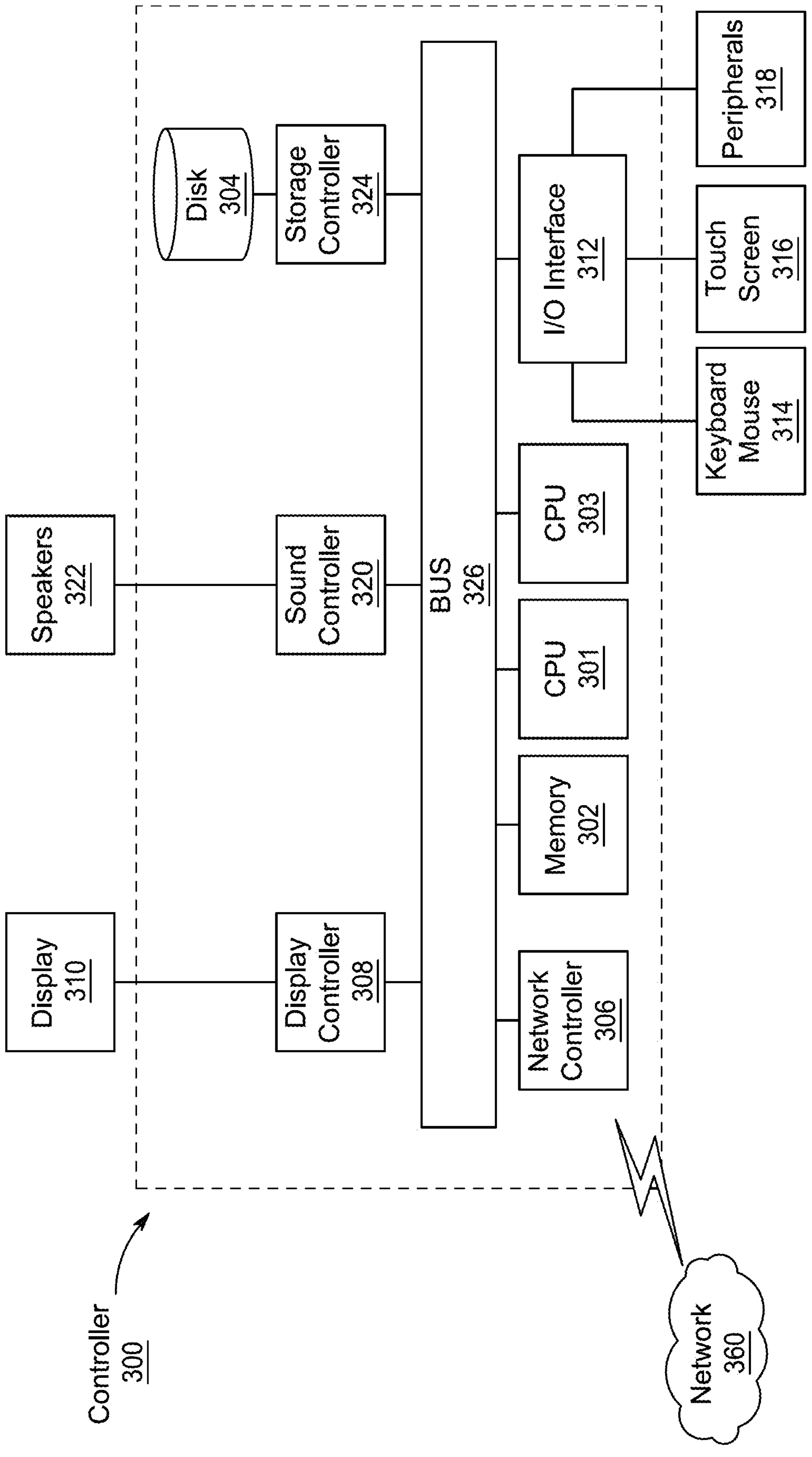
FIG. 3 is an illustration of a non-limiting example of details of computing hardware used in the computing system, according to certain embodiments

Next, further details of the hardware description of the computing environment according to exemplary embodiments are described with reference to FIG. 3. In FIG. 3, a controller 300 is described as representative of the system in which the controller is a computing device that includes a CPU 301, which performs the processes described above/below. The process data and instructions may be stored in memory 302. These processes and instructions may also be stored on a storage medium disk 304, such as a hard drive (HDD) or portable storage medium, or may be stored remotely.

Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the present disclosure may be provided as a utility application, background daemon, or component of an operating system, or combination thereof, executing in conjunction with CPU 301, 303 and an operating system such as Microsoft Windows 7, Microsoft Windows 10, UNIX, LINUX, Apple MAC-OS and other systems known to those skilled in the art.

The hardware elements in order to achieve the computing device may be realized by various circuitry elements, known to those skilled in the art. For example, CPU 301 or CPU 303 may be a Xenon or Core processor from Intel of America or an Opteron processor from AMD of America, or may be other processor types that would be recognized by one of ordinary skill in the art. Alternatively, the CPU 301, 303 may be implemented on an FPGA, ASIC, PLD or using discrete logic circuits, as one of ordinary skill in the art would recognize. Further, CPU 301, 303 may be implemented as multiple processors cooperatively working in parallel to perform the instructions of the inventive processes described above.

The computing device in FIG. 3 also includes a network controller 306, such as an Intel Ethernet PRO network interface card from Intel Corporation of America, for interfacing with network 360. As can be appreciated, the network 360 can be a public network, such as the Internet, or a private network, such as an LAN or WAN network, or any combination thereof and can also include PSTN or ISDN subnetworks. The network 360 can also be wired, such as an Ethernet network, or can be wireless, such as a cellular network including EDGE, 3G, 4G, and 5G wireless cellular systems. The wireless network can also be WiFi, Bluetooth, or any other type of wireless communication that is known.

The computing device further includes a display controller 308, such as a NVIDIA GeForce GTX or Quadro graphics adaptor from NVIDIA Corporation of America for interfacing with display 310, such as a Hewlett Packard HPL2445w LCD monitor. A general-purpose I/O interface 312 interfaces with a keyboard and/or mouse 314, as well as a touch screen panel 316 on or separate from a display 310. The general-purpose I/O interface also connects to a variety of peripherals 318 including printers and scanners, such as an OfficeJet or DeskJet from Hewlett-Packard.

A sound controller 320 is also provided in the computing device, such as Sound Blaster X-Fi Titanium from Creative, to interface with speakers/microphone 322, thereby providing sounds and/or music.

The general-purpose storage controller 324 connects the storage medium disk 304 with the communication bus 326, which may be an ISA, EISA, VESA, PCI, or similar, for interconnecting all of the components of the computing device. A description of the general features and functionality of the display 310, keyboard and/or mouse 314, as well as the display controller 308, storage controller 324, network controller 306, sound controller 320, and general purpose I/O interface 312 is omitted herein for brevity, as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 4.

Figure 4:
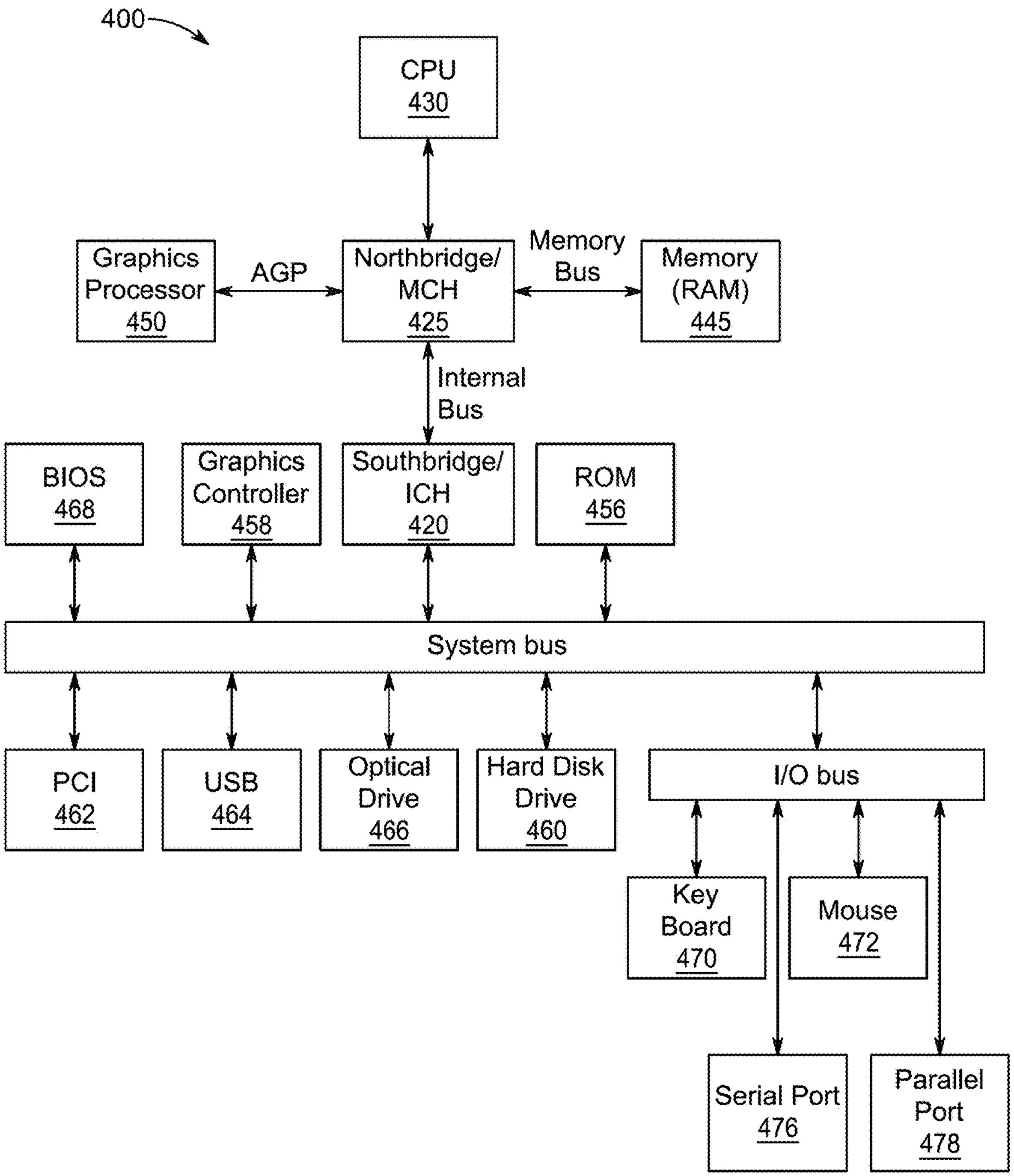
FIG. 4 is an exemplary schematic diagram of a data processing system used within the computing system, according to certain embodiments.

FIG. 4 shows a schematic diagram of a data processing system, according to certain embodiments, for performing the functions of the exemplary embodiments. The data processing system is an example of a computer in which code or instructions implementing the processes of the illustrative embodiments may be located.

In FIG. 4, data processing system 400 employs a hub architecture including a north bridge and memory controller hub (NB/MCH) 425 and a south bridge and input/output (I/O) controller hub (SB/ICH) 420. The central processing unit (CPU) 430 is connected to NB/MCH 425. The NB/MCH 425 also connects to the memory 445 via a memory bus, and connects to the graphics processor 450 via an accelerated graphics port (AGP). The NB/MCH 425 also connects to the SB/ICH 420 via an internal bus (e.g., a unified media interface or a direct media interface). The CPU Processing unit 430 may contain one or more processors and even may be implemented using one or more heterogeneous processor systems.

Figure 5:
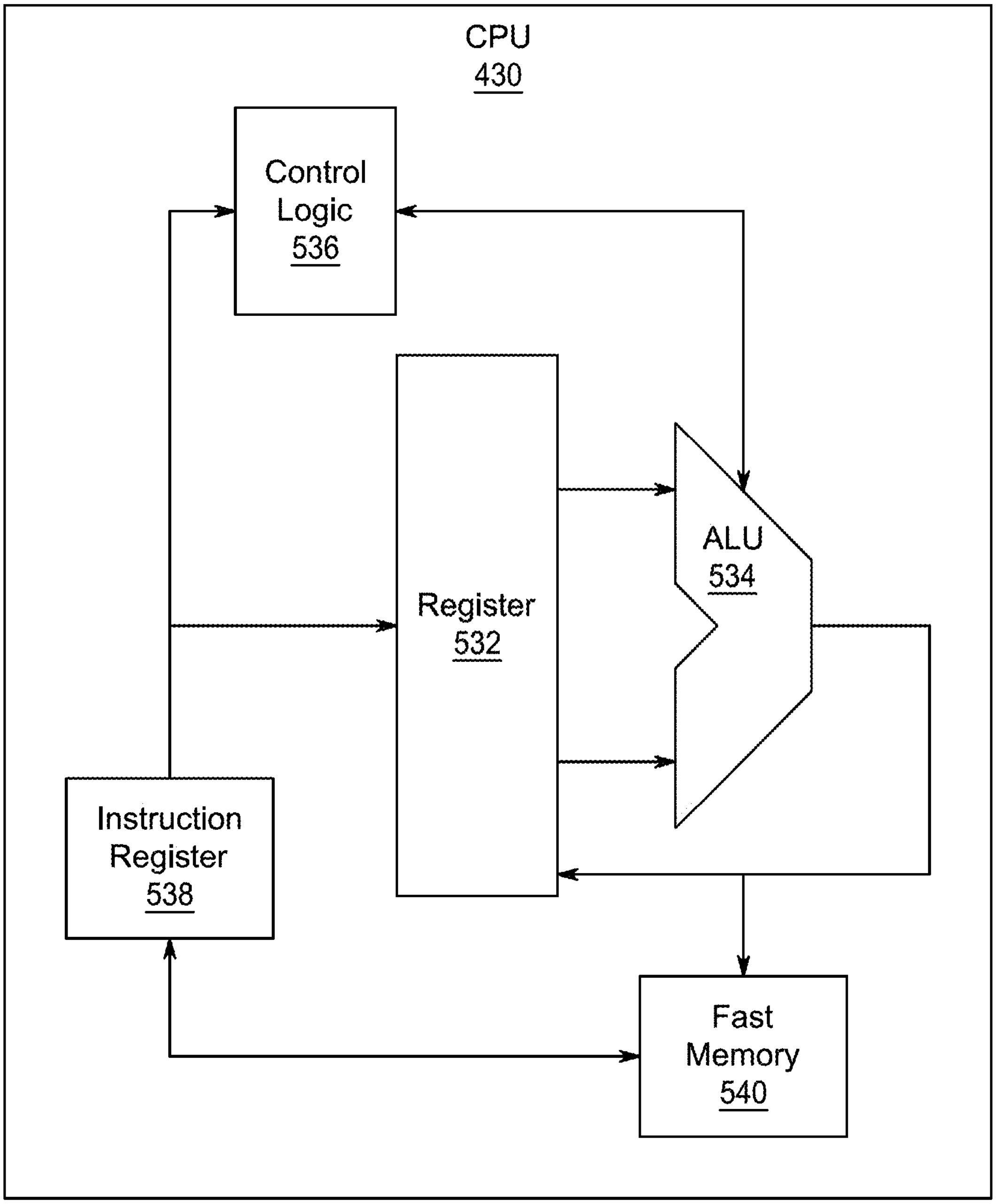
FIG. 5 is an exemplary schematic diagram of a processor used with the computing system, according to certain embodiments.

For example, FIG. 5 shows one implementation of CPU 430. In one implementation, the instruction register 438 retrieves instructions from the fast memory 540. At least part of these instructions are fetched from the instruction register 538 by the control logic 536 and interpreted according to the instruction set architecture of the CPU 430. Part of the instructions can also be directed to the register 532. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 534 that loads values from the register 532 and performs logical and mathematical operations on the loaded values according to the instructions. The results from these operations can be feedback into the register and/or stored in the fast memory 540. According to certain implementations, the instruction set architecture of the CPU 430 can use a reduced instruction set architecture, a complex instruction set architecture, a vector processor architecture, a very large instruction word architecture. Furthermore, the CPU 430 can be based on the Von Neuman model or the Harvard model. The CPU 430 can be a digital signal processor, an FPGA, an ASIC, a PLA, a PLD, or a CPLD. Further, the CPU 430 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 4, the data processing system 400 can include that the SB/ICH 420 is coupled through a system bus to an I/O Bus, a read only memory (ROM) 456, universal serial bus (USB) port 464, a flash binary input/output system (BIOS) 468, and a graphics controller 458. PCI/PCIe devices can also be coupled to SB/ICH 488 through a PCI bus 462.

The PCI devices may include, for example, Ethernet adapters, add-in cards, and PC cards for notebook computers. The Hard disk drive 460 and CD-ROM 466 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 466 can also be coupled to the SB/ICH 420 through a system bus. In one implementation, a keyboard 470, a mouse 472, a parallel port 478, and a serial port 476 can be connected to the system bus through the I/O bus. Other peripherals and devices that can be connected to the SB/ICH 420 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 6:
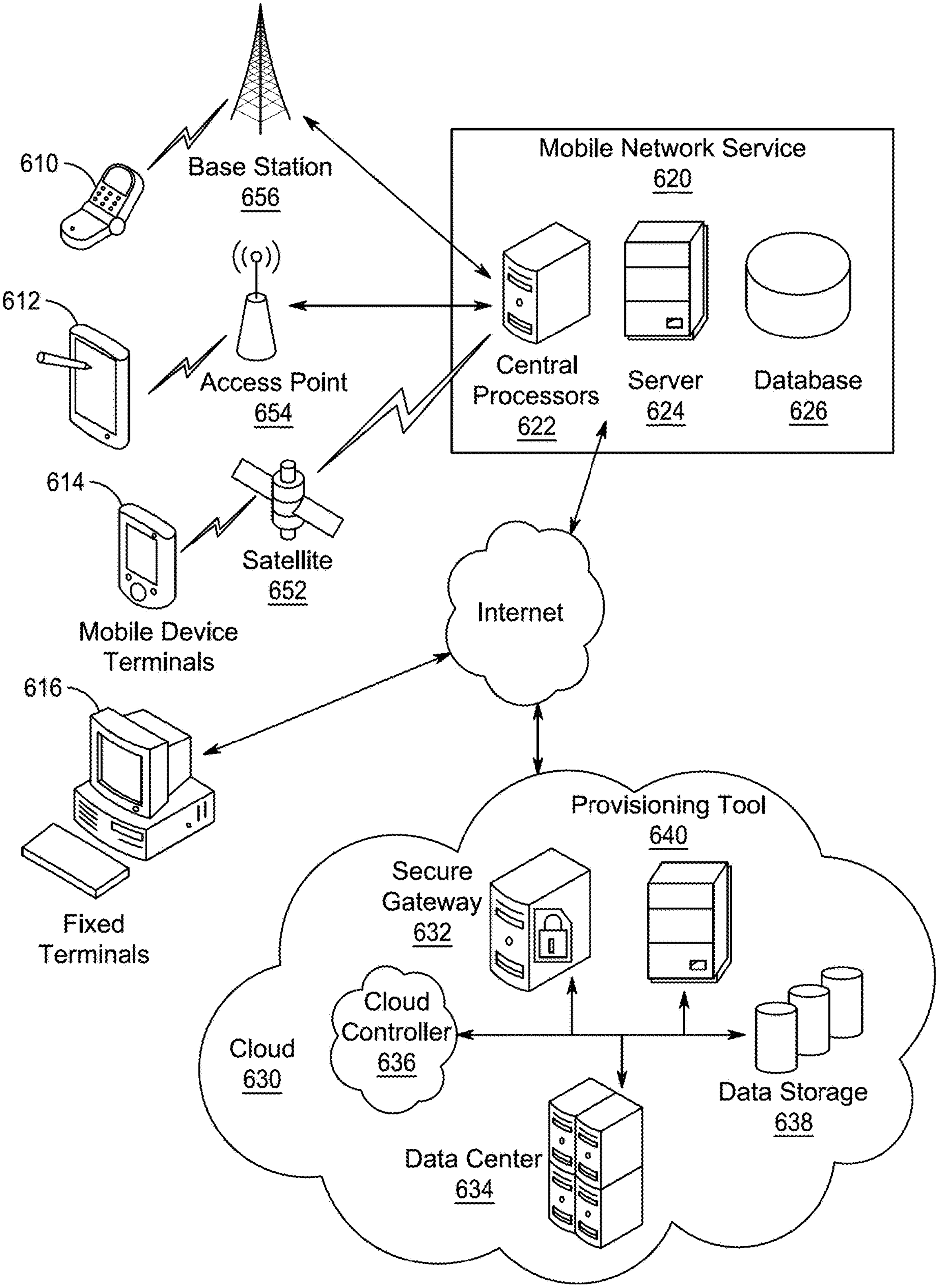
FIG. 6 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 6, in addition to various human interface and communication devices (e.g., display monitors, smart phones, tablets, personal digital assistants (PDAs)). More specifically, FIG. 6 illustrates client devices including a smart phone 11, a tablet 12, a mobile device terminal 14 and fixed terminals 16. These client devices may be commutatively coupled with a mobile network service 20 via a base station 656, an access point 654, a satellite 652 or via an internet connection. The mobile network service 620 may comprise central processors 622, a server 624 and a database 626. The fixed terminals 616 and the mobile network service 620 may be commutatively coupled via an internet connection to functions in cloud 630 that may comprise a security gateway 632, a data center 634, a cloud controller 636, a data storage 638 and a provisioning tool 640. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A remote sensing system for real time interpretation of aerial images, comprising: a plurality of remote imaging platforms for capturing a plurality of aerial images of the Earth at multiple resolutions; machine learning processing circuitry configured for a deep learning model including an input device configured to input an image of the plurality of aerial images; a Gaussian pyramid module configured to learn to generate multiple feature maps, at different original scales ranging from coarse to fine scales, from the input image; a scale selection block to recalibrate significance of features in the feature maps across the different original scales dynamically, by upsampling a coarsest three of the feature maps to match dimensions of the finest feature map, such that the multiple feature maps are at a same dimension; a feature extraction module having a plurality of separate feature extractors to convert respective feature maps from the scale selection block into 1D vectors, wherein the 1D vectors are stacked across scales to form a single vector, which is passed through a scale attention module to obtain attention weights; a cross propagation feature module that passes the generated multiple feature maps from the Gaussian pyramid module through an uncertainty network to generate a corresponding uncertainty map, which contains an uncertainty score for each pixel in the input image, wherein the generated multiple feature maps are concatenated with each other according to the uncertainty maps to generate enhanced feature maps, which undergo fusion and addition to generate an enhanced scale feature map; a complexity-aware pooling mechanism to preserve both semantic and discriminative features based on the recalibrated feature maps and the enhanced feature maps; and a classification head to classify the aerial images into a corresponding class; and an output device configured to output the aerial images and a respective label for the corresponding class.

2. The system of claim 1, wherein the plurality of remote imaging platforms includes at least one satellite and at least one unmanned aerial vehicle (UAV) for capturing the plurality of aerial images of the Earth, and wherein the aerial images captured by the at least one satellite are a first resolution and the aerial images captured by the at least one UAV are a second resolution that is higher than the first resolution.

3. The system of claim 2, further comprising a base station including receiving circuitry configured to receive the plurality of aerial images of the Earth from the at least one satellite and the at least one UAV, memory for storing the received plurality of aerial images, and processing circuitry including the machine learning processing circuitry.

4. The system of claim 3, wherein the processing circuitry is configured to organize the aerial images by region, wherein each region includes an aerial image captured by the at least one satellite and a plurality of high resolution images captured by the at least one UAV, choose a region of interest from among the regions;

for the chosen region of interest, display the plurality of the high resolution images corresponding to the region as detailed images for the aerial image captured by the at least one satellite for the same region.

5. The system of claim 4, wherein the processing circuitry is further configured to display the high resolution images annotated with respective labels for the class.

6. The system of claim 5, wherein the high resolution images are a resolution of 5 cm or less per pixel.

7. The system of claim 1, wherein the Gaussian pyramid module includes four convolutional kernels initialized with Gaussian weights and increasing blur strengths to generate slightly blurred, moderately blurred, strongly blurred, and super blurred versions of each image.

8. The system of claim 1, wherein the scale selection block is configured to stack four vectors of the feature map and average across scales to form a single vector, and pass the single vector through a scale attention module, which generates a plurality of attention weights for corresponding scales.

9. The system of claim 1, wherein the cross propagation feature module is configured to enhance the feature maps by generating a corresponding uncertainty map, wherein the uncertainty map contains a score from {0-1} for each pixel value, where higher scores mean that the model is uncertain about the pixel, while a lower score implies certainty, and wherein the original scales are concatenated with each other according to the uncertainty maps to generate multiple enhanced scale feature maps.

10. The system of claim 1, wherein the complexity-aware pooling mechanism includes a complexity net to generate a complexity score for each image, an average pooling layer, and a max pooling layer, wherein the mechanism is configured to multiply the complexity score by Maximum pooled features of the max pooling layer, multiply average pooled features of the average pooling layer by 1 minus the complexity score, and add outputs of both of the multiplying operations to create a single pooled feature map.

11. A method for real time interpretation of aerial images by a deep learning model, comprising: capturing, by a plurality of remote imaging platforms, a plurality of aerial images of the Earth at multiple resolutions; inputting, by an input device, an image of the plurality of aerial images; learning to generate, by a Gaussian pyramid module of machine learning circuitry, multiple feature maps, at different original scales ranging from coarse to fine scales, from the input image; recalibrating significance, by a scale selection block, of features in the feature maps across the different original scales dynamically, by upsampling a coarsest three of the feature maps to match dimensions of the finest feature map, such that the multiple feature maps are at a same dimension; converting, by a feature extraction module having a plurality of separate feature extractors, respective feature maps from the scale selection block into 1D vectors, wherein the 1D vectors are stacked across scales to form a single vector, which is passed through an attention module to obtain attention weights; passing, by a cross propagation feature module, the generated multiple feature maps from the Gaussian pyramid module through an uncertainty network to generate a corresponding uncertainty map, which contains an uncertainty score for each pixel in the input image, wherein the generated multiple feature maps are concatenated with each other according to the uncertainty maps to generate enhanced feature maps, which undergo fusion and addition to generate an enhanced scale; preserving, by a complexity-aware pooling mechanism, both semantic and discriminative features based on the recalibrated feature maps and the enhanced feature maps; classifying, by a classification head, the aerial images into a corresponding class; and outputting, by an output device, the aerial images and a respective label for the corresponding class.

12. The method of claim 11, further comprising capturing, by the plurality of remote imaging platforms that includes at least one satellite and at least one unmanned aerial vehicle (UAV), the plurality of aerial images of the Earth, wherein the aerial images captured by the at least one satellite are a first resolution and the aerial images captured by the at least one UAV a second resolution that is higher than the first resolution.

13. The method of claim 12, further comprising:

receiving, by receiving circuitry in a base station, the plurality of aerial images of the Earth from the at least one satellite and the at least one UAV; and storing, in memory, the received plurality of aerial images.

14. The method of claim 13, further comprising:

organizing, by processing circuitry, the aerial images by region, wherein each region includes an aerial image captured by the at least one satellite and a plurality of high resolution images captured by the at least one UAV;

choosing a region of interest from among the regions;

for the chosen region of interest, displaying the plurality of the high resolution images corresponding to the region as detailed images for the aerial image captured by the at least one satellite for the same region.

15. The method of claim 14, further comprising displaying, by the processing circuitry, the high resolution images annotated with respective labels for the class.

16. The method of claim 15, wherein the high resolution images are a resolution of 5 cm or less per pixel.

17. The method of claim 11, further comprising:

initializing, by the Gaussian pyramid module, four convolutional kernels with Gaussian weights; and increasing blur strengths to generate slightly blurred, moderately blurred, strongly blurred, and super blurred versions of each image.

18. The method of claim 11, further comprising:

stacking, by the scale selection block, four vectors of the feature map and averaging across scales to form a single vector;

passing the single vector through a scale attention module; and generating, by the scale attention module, four attention weights for corresponding scales.

19. The method of claim 11, further comprising enhancing, by the cross propagation feature module, the feature maps by generating a corresponding uncertainty map, wherein the uncertainty map contains a score from {0-1} for each pixel value, where higher scores mean that the model is uncertain about this pixel, while a lower score implies certainty, and wherein the multiple scales are concatenated with each other according to the uncertainty maps to generate multiple enhanced scale feature maps.

20. The method of claim 11, further comprising:

generating, by a complexity net of the complexity-aware pooling mechanism, a complexity score for each image;

multiplying the complexity score by Maximum pooled features of a max pooling layer;

multiplying average pooled features of an average pooling layer by 1 minus the complexity score, and adding outputs of both of the multiplying operations to create a single pooled feature map.

* * * * *